United States Patent
Lee et al.

(10) Patent No.: US 11,394,055 B2
(45) Date of Patent: Jul. 19, 2022

(54) ELECTROLYTE FOR LITHIUM SECOND BATTERY, AND LITHIUM SECOND BATTERY COMPRISING THE ELECTROLYTE

(71) Applicant: Samsung Electronics Co., Ltd., Suwon-si (KR)

(72) Inventors: Yonggun Lee, Incheon (KR); Yooseong Yang, Yongin-si (KR); Wonseok Chang, Seoul (KR); Hongsoo Choi, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/089,051

(22) Filed: Apr. 1, 2016

(65) Prior Publication Data
US 2016/0294005 A1 Oct. 6, 2016

(30) Foreign Application Priority Data

Apr. 3, 2015 (KR) .......................... 10-2015-0047490
Mar. 30, 2016 (KR) .......................... 10-2016-0038753

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 4/382* (2013.01); *H01M 10/052* (2013.01);
(Continued)

(58) Field of Classification Search
CPC .......... H01M 10/052; H01M 10/0569; H01M 2004/027; H01M 2300/0028;
(Continued)

(56) References Cited

U.S. PATENT DOCUMENTS 4,357,215 A   11/1982 Goodenough et al.
5,196,484 A * 3/1993 Giles ...................... C08C 19/06
                                                          525/130
(Continued)

FOREIGN PATENT DOCUMENTS

CN   1253390 A   5/2000
CN   1356733 A   7/2002
(Continued)

OTHER PUBLICATIONS

Khandpur, et al., "Polyisoprene-Polystyrene Diblock Copolymer Phase Diagram near the Order-Disorder Transition," Macromolecules, vol. 28, 1995, pp. 8796-8806.
(Continued)

*Primary Examiner* — Ula C Ruddock
*Assistant Examiner* — Sarika Gupta
(74) *Attorney, Agent, or Firm* — Cantor Colburn LLP

(57) ABSTRACT

An electrolyte for a lithium secondary battery, the electrolyte including: a block copolymer including a structural domain and a rubbery domain, wherein the structural domain includes a structural block including a plurality of structural repeating units, and wherein the rubbery domain includes a rubbery block including a plurality of rubbery repeating units.

17 Claims, 11 Drawing Sheets

(51) Int. Cl.
*H01M 4/38* (2006.01)
*H01M 10/0566* (2010.01)
*H01M 10/0568* (2010.01)
*H01M 4/02* (2006.01)

(52) U.S. Cl.
CPC ... *H01M 10/0566* (2013.01); *H01M 10/0568* (2013.01); *H01M 2004/027* (2013.01); *H01M 2300/0082* (2013.01)

(58) Field of Classification Search
CPC ...... H01M 4/134; H01M 4/366; H01M 4/382; H01M 4/405; H01M 4/628; Y02T 10/7011

See application file for complete search history.

(56) References Cited

U.S. PATENT DOCUMENTS

| | | |
|---|---|---|
| 6,797,436 B2 | 9/2004 | Takizawa et al. |
| 7,513,136 B2 | 4/2009 | Laliberte et al. |
| 7,531,012 B2 | 5/2009 | Sudano et al. |
| 7,547,492 B2 | 6/2009 | Awano et al. |
| 7,968,224 B2 | 6/2011 | Sudano et al. |
| 8,258,197 B2 | 9/2012 | Lavigne et al. |
| 8,268,197 B2 | 9/2012 | Singh et al. |
| 8,445,140 B2 * | 5/2013 | Bertin ............... H01M 10/0565 429/304 |
| 8,563,168 B2 | 10/2013 | Balsara et al. |
| 2002/0110738 A1 | 8/2002 | Takizawa et al. |
| 2003/0118913 A1 * | 6/2003 | Takami ............... H01M 50/116 429/337 |
| 2009/0061321 A1 | 3/2009 | Yakovleva et al. |
| 2009/0075176 A1 | 3/2009 | Singh et al. |
| 2009/0263725 A1 | 10/2009 | Balsara et al. |
| 2010/0035158 A1 | 2/2010 | Kato et al. |
| 2010/0221614 A1 | 9/2010 | Bertin et al. |
| 2010/0310965 A1 | 12/2010 | Nakai et al. |
| 2011/0033755 A1 * | 2/2011 | Eitouni ............... H01M 4/134 429/310 |
| 2011/0206994 A1 * | 8/2011 | Balsara ............ H01M 10/0565 429/302 |
| 2011/0223484 A1 | 9/2011 | Korgel et al. |
| 2011/0274983 A1 | 11/2011 | Yontz et al. |
| 2011/0281173 A1 | 11/2011 | Singh et al. |
| 2011/0300469 A1 | 12/2011 | Ono et al. |
| 2012/0189910 A1 * | 7/2012 | Brune ............... C08G 81/025 429/189 |
| 2013/0095392 A1 * | 4/2013 | Shin ............... H01G 9/2013 429/338 |
| 2015/0155594 A1 | 6/2015 | Lee et al. |
| 2016/0013515 A1 | 1/2016 | Lee et al. |
| 2016/0064770 A1 | 3/2016 | Lee et al. |
| 2016/0064772 A1 | 3/2016 | Choi et al. |
| 2016/0064773 A1 | 3/2016 | Choi et al. |
| 2016/0072148 A1 | 3/2016 | Lee et al. |
| 2016/0248100 A1 * | 8/2016 | Joo .................... H01M 4/8828 |

FOREIGN PATENT DOCUMENTS

| | | | |
|---|---|---|---|
| CN | 100436535 C | 11/2008 | |
| CN | 101536114 A | 9/2009 | |
| CN | 101939869 A | 1/2011 | |
| CN | 101939870 A | 1/2011 | |
| CN | 102318011 A | 1/2012 | |
| CN | 102770988 A | 11/2012 | |
| EP | 0997960 A2 | 5/2000 | |
| EP | 1215244 A2 | 6/2002 | |
| EP | 1215244 A3 | 9/2007 | |
| EP | 1215244 B1 * | 12/2012 | ............. H01M 6/22 |
| KR | 1020100081304 A | 7/2010 | |
| KR | 1020110124233 A | 11/2011 | |
| TW | 201315766 A1 | 4/2013 | |
| WO | 2009092058 A1 | 7/2009 | |
| WO | 2010039606 A2 | 4/2010 | |
| WO | 2010039606 A3 | 4/2010 | |

OTHER PUBLICATIONS

Soto-Figueroa et al., "Thermal Study on Phase Transitions of Block Copolymers by Mesoscopic Simulation," Advances in Chemical Engineering, Mar. 2012, pp. 563-584.
Staniewicz et al., "The effect of osmium staining on lamellar spacing in thin polystyrene-polyisoprene diblock copolymer films," Journal of Physics, Conference Series, 241, 2010, pp. 1-5.
European Search Report for European Patent Application No. 16163234.4 dated Aug. 10, 2016.
Chinese Office Action for Chinese Patent Application No. 201610202112.4 dated Sep. 4, 2019.
Chinese Office Action for Chinese Patent Application No. 201610202112.4 dated Jun. 10, 2020.
Chinese Office Action for Chinese Patent Application No. 201610202112.4 dated Jun. 15, 2021.
Inceoglu, Sebnem et al. "Morphology-Conductivity Relationship of Single-Ion-Conducting Block Copolymer Electrolytes for Lithium Batteries", ACS Macro Letters, vol. 3, No. 6, Jun. 30, 2014, pp. 510-514.
Jingze Li et al. Applications of Block Copolymer Films in the Field of Electrochemical Energy Systems:, China Academic Journal Electronic Publishing House, vol. 16, No. 1, Feb. 15, 2010, pp. 11-15.

* cited by examiner

ELECTROLYTE FOR LITHIUM SECOND BATTERY, AND LITHIUM SECOND BATTERY COMPRISING THE ELECTROLYTE

CROSS-REFERENCE TO RELATED APPLICATION

This application claims priority to and the benefit of Korean Patent Application Nos. 10-2015-0047490, filed on Apr. 3, 2015, and 10-2016-0038753 filed on Mar. 30, 2016 in the Korean Intellectual Property Office, and all the benefits accruing therefrom under 35 U.S.C. § 119, the content of which is incorporated herein in its entirety by reference.

BACKGROUND

1. Field

The present disclosure relates to an electrolyte for a lithium secondary battery, and a lithium secondary battery including the electrolyte.

2. Description of the Related Art

Lithium secondary batteries are high-performance batteries having the highest energy density among other currently available secondary batteries, and are applicable in various fields such as electric vehicles.

A lithium secondary battery may use a lithium thin film as an anode. However, the lithium thin film may be highly reactive to the liquid electrolyte during charging or discharging due to the high reactivity of the lithium metal, or may lead to dendrite growth on the lithium thin film anode. Accordingly, a lithium secondary battery including a lithium metal thin film may have reduced lifetime and stability. Therefore, there is a need for a lithium battery having improved cell performance.

SUMMARY

Provided is an electrolyte for lithium secondary batteries.

Provided is a lithium secondary battery with improved cell performance that includes the electrolyte.

Additional aspects will be set forth in part in the description which follows and, in part, will be apparent from the description, or may be learned by practice of the presented embodiments.

According to an aspect, an electrolyte for a lithium secondary battery includes:

a block copolymer including a structural domain and a rubbery domain, wherein the structural domain includes a structural block including a plurality of structural repeating units, and wherein the rubbery domain includes a rubbery block including a plurality of rubbery repeating units.

In some embodiments, a weight ratio of the structural block to the rubbery block in the electrolyte may be in a range of about 1:1 to about 1:4.

According to another aspect, a lithium secondary battery includes:

a cathode;

an anode; and the electrolyte disposed between the cathode and the anode.

In some embodiments, the anode of the lithium secondary battery may be a lithium metal or lithium metal alloy electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
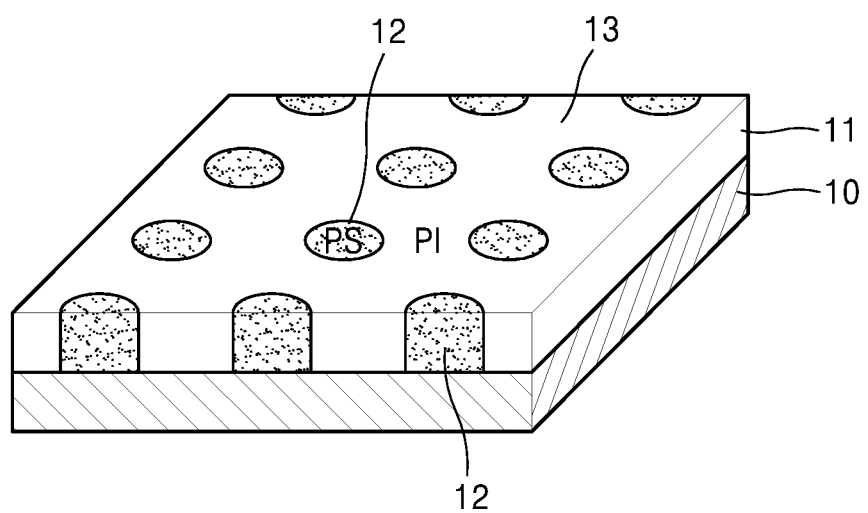
FIG. 1 is a schematic view of an electrolyte disposed on a substrate according to an embodiment.

Reference will now be made in detail to embodiments of an electrolyte for lithium secondary batteries, a method of preparing the electrolyte, and a lithium secondary battery including the electrolyte, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." As used herein, the terms such as "comprising", "including", "having", or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, with reference to attached drawings, an electrolyte for a secondary battery, a method of preparing the electrolyte, and a secondary battery including the electrolyte according to an exemplary embodiment will be described in detail. However, these are for illustrative purposes only and are not intended to limit the scope of the inventive concept. The scope of the inventive concept is indicated by the claims rather than by the detailed description.

A C rate means a current which will discharge a battery in one hour, e.g., a C rate for a battery having a discharge capacity of 1.6 ampere-hours would be 1.6 amperes.

According to an aspect, an electrolyte for a lithium secondary battery includes a block copolymer including a structural domain and a rubbery domain. The structural domain includes a structural block of the block copolymer, and the rubbery domain includes a rubbery block of the block copolymer. The structural block includes a plurality of structural repeating units, and the rubbery block includes a plurality of rubbery repeating units.

A weight ratio of the structural block to the rubbery block may be in a range of about 1:1 to about 1:4, about 1:1.2 to about 1:3.5, or about 1:1.4 to about 1:3.

When content of the structural block with respect to the rubbery block is within this range of weight ratio, the electrolyte may effectively control growth of lithium dendrites without reduction in ductility and tensile modulus characteristics or strength of the electrolyte.

When the weight ratio of the structural block to the rubbery block is within the above range of weight ratio, the block copolymer may have a cylindrical phase. When the block copolymer has a cylindrical phase, a larger amount of the rubbery domain may be impregnated with a liquid electrolyte, compared to when the block copolymer has a lamellar structure, so the conduction characteristics of the liquid electrolyte, interfacial characteristics between lithium metal and the liquid electrolyte, and consequentially ionic conductivity of the liquid electrolyte may be improved.

In some embodiments, the electrolyte may further include a liquid electrolyte, a polymer ionic liquid, a solid electrolyte, a gel electrolyte, a separator, or a combination thereof to further improve the ionic conductivity and mechanical characteristics of the electrolyte.

In some embodiments, the electrolyte may further include a liquid electrolyte to allow the rubbery domain of the electrolyte to form an ion conduction pathway in the electrolyte.

The liquid electrolyte may include an organic solvent, an ionic liquid, an alkali metal salt, an alkaline earth metal salt, or a combination thereof. For example, the organic solvent may be a carbonate solvent, a glyme solvent, a dioxolane solvent, dimethyl ether, 1,1,2,2-tetrafluoroethyl 2,2,3,3-tetrafluoropropyl ether, or any combination thereof.

In some embodiments, the electrolyte is used together with a liquid electrolyte including an organic solvent, for example, a carbonate solvent. The electrolyte may be stable in the presence of the liquid electrolyte including an organic solvent or in the presence of an organic solvent such as a carbonate solvent.

An electrolyte that may serve as a lithium metal protection layer may be a gel electrolyte including a polymer and a liquid electrolyte. However, in such electrolytes the polymer for the gel polymer membrane may have unsatisfactory mechanical characteristics, or insufficient tensile modulus and ductility characteristics, even at high stress, and thus may not satisfactorily suppress the growth of lithium dendrites.

When the gel electrolyte is prepared using polymer having a low modulus, inorganic nanoparticles may be further added. When inorganic nanoparticles are added, the gel electrolyte may have improved mechanical characteristics, and also increased interfacial resistance.

When an electrolyte includes a lithium metal protection layer that includes a block copolymer including a polyethylene oxide domain, the lithium metal protection layer may be dissolved in a liquid electrolyte including a carbonate organic solvent.

However, in some embodiments, when the electrolyte includes a block copolymer including a structural domain and a rubbery domain serving as an ion conduction pathway, the electrolyte may have improved stiffness, tensile modulus, ductility characteristics, and stability against a liquid electrolyte including a carbonate organic solvent.

In some embodiments, the electrolyte may also have a uniform ion distribution at the interface with an electrode to effectively suppress dendrite formation. In addition, microphase separation in the structural domain and rubbery domain may be facilitated, which makes it easy to form a nanostructure at a low cost. Accordingly, a lithium secondary battery with improved cycle characteristics may be manufactured using the electrolyte disclosed herein.

The block copolymer of the electrolyte may not include an alkylene oxide repeating unit.

The amount of the rubbery block of the block copolymer may be in a range of about 50 parts to about 80 parts by weight, and in some embodiments, about 70 parts to about 78 parts by weight, or about 55 parts to about 75 parts by weight, based on 100 parts by weight of a total weight of the block copolymer. While not wishing to be bound by theory, it is understood that when the amount of the rubbery block is within these ranges, the electrolyte may have improved ductility and tensile modulus characteristics.

The plurality of rubbery repeating units that form the rubbery block may be polyisoprene, polybutadiene, polychloroprene, polyisobutylene, or a copolymer comprising units thereof, such as a poly(butadiene-isoprene) copolymer, or polyurethane, wherein polyisoprene, polybutadiene, and polychloroprene, and their corresponding copolymers, are diene polymers.

The structural repeating unit in the structural block may be responsible for the mechanical characteristics of the block copolymer. For example, the structural repeating unit may be derived from, but is not limited to, styrene, 4-bromostyrene, tert-butylstyrene, divinylbenzene, methyl methacrylate, isobutyl methacrylate, ethylene, propylene, butylene, polymerizable dimethylsiloxane derivatives, N-isopropylacrylamide, vinylidene fluoride, acrylonitrile, methacrylonitrile, 4-methylpentene-1, ester precursors such as C1 to C6 diols (e.g., ethylene glycol or butylene glycol) and C3 to C12 diacids (e.g., terephthalic acid) and vinylpyridine, or a combination thereof.

In some embodiments, the block including a structural repeating unit may be polystyrene, hydrogenated polystyrene, poly(C1-C6 alkyl)methacrylate, poly(methyl methacrylate), polyvinylpyridine, polyvinyl cyclohexane, polyimide, polyamide, polyethylene, polybutylene, polypropylene, poly(4-methylpentene-1), poly(butylene terephthalate), poly(isobutyl methacrylate), poly(ethylene terephthalate), polydimethylsiloxane, polyacrylonitrile, polymethacrylonitrile, polymaleic acid, poly(maleic anhydride), poly(methacrylic acid), poly(cyclohexyl methacrylate), poly(cyclohexyl vinyl ether), polyvinylidenefluoride, polydivinylbenzene, a combination thereof, or may include a copolymer of at least two types of units forming these polymers.

In some embodiments, the structural domain may include a block including a plurality of structural repeating units. For example, the block may have a weight average molecular weight of about 10,000 Daltons or greater, in some embodiments, about 10,000 to about 500,000 Daltons, and in some other embodiments, about 15,000 to about 400,000 Daltons.

In some embodiments, the rubbery domain may include a block including a plurality of rubbery repeating units. For example, the block may have a weight average molecular weight of about 10,000 Daltons or greater, in some embodiments, about 10,000 to about 500,000 Daltons, and in other some other embodiments, about 15,000 to about 400,000 Daltons. While not wishing to be bound by theory, it is understood that when the rubbery domain includes a block having a weight average molecular weight within these ranges, the electrolyte may have improved tensile modulus and ductility characteristics and improved intensity.

For example, the amount of the block that forms the structural domain may be in a range of about 20 parts to about 50 parts by weight, and in some embodiments, about 22 parts to about 30 parts by weight, based on 100 parts by weight of a total weight of the block copolymer. While not wishing to be bound by theory, it is understood that when the amount of the block of the block copolymer is within these ranges, the electrolyte may have improved mechanical characteristics, including strong intensity.

In some embodiments, the block copolymer may be a diblock copolymer (A-B) or a triblock copolymer (A-B-A' or B-A-B'), wherein the blocks A and A' may be structural polymer units, each independently derived from polystyrene (PS), polydivinylbenzene, polymethylmethacrylate, polyvinylpyridine, polyimide, polyethylene, polypropylene, polyvinylidene fluoride, polyacrylonitrile, polydimethylsiloxane, or a combination thereof, and the blocks B and B' may be each independently derived from polyisoprene, polybutadiene, polychloroprene, polyisopolybutylene, polyurethane, or a combination thereof.

In some embodiments, the block copolymer of the electrolyte may be:
  a block copolymer including a polystyrene first block and
    a polyisoprene second block;
  a block copolymer including a polystyrene first block, a
    polyisoprene second block, and a polystyrene third
    block;
  a block copolymer including a polystyrene first block and
    a polybutadiene second block; or
  a block copolymer including a polystyrene first block, a
    polybutadiene second block, and a polystyrene third
    block.

In some embodiments, when the block copolymer of the electrolyte is a block copolymer including a first block, a second block, and a third block, the amounts of the first block and third block may be in a range of about 20 parts to about 35 parts by weight, and in some embodiments, about 22 parts to about 30 parts by weight, based on 100 parts by weight of a total weight of the block copolymer, and the amount of the second block may be in a range of about 65 parts to about 80 parts by weight, and in some embodiments, about 70 parts to about 78 parts by weight, based on 100 parts by weight of the total weight of the block copolymer.

FIG. 1 is a schematic view of an electrolyte 11 according to an embodiment disposed on a substrate.

Referring to FIG. 1, the electrolyte 11 is disposed on a substrate 10. The electrolyte 11 includes a block copolymer with a structural domain 12 including a polystyrene (PS) block and a rubbery domain 13 including a polyisoprene (PI) block.

In some embodiments, the electrolyte may further include inorganic particles. The inorganic particle may include a metal hydroxide, a metal carbonate, a metal carboxylate, a metal silicate, a metal aluminosilicate, a metal carbide, a metal nitride, a metal halide, a metal nitrate, a carbon oxide, a carbonaceous material, an organic-inorganic composite, or a combination thereof. For example, the inorganic particle may comprise $SiO_2$, $TiO_2$, ZnO, $Al_2O_3$, $BaTiO_3$, a silsesquioxane such as a silsesquioxane having a cage structure, a metal-organic framework (MOF), or a combination thereof. When the electrolyte further includes an inorganic particle, the electrolyte may have further improved mechanical properties. The inorganic particles may have an average particle diameter of 1 micrometer (μm) or less, in some embodiments, 500 nanometers (nm) or less, in some other embodiments, 500 nm, and in still some other embodiments, 100 nm or less. For example, the inorganic particles may have an average particle diameter of about 1 nm to about 1000 nm, in some embodiments, about 5 nm to about 500 nm, in some other embodiments, about 10 nm to about 100 nm, in still some other embodiments, about 10 nm to about 70 nm, and in yet other embodiments, about 30 nm to about 70 nm. While not wishing to be bound by theory, it is understood that when the average particle diameter of the inorganic particles is within these ranges, it may be possible to prepare an electrolyte having improved film formability and improved mechanical properties without deterioration in ionic conductivity.

The inorganic particles may comprise $SiO_2$, a silsesquioxane, $TiO_2$, ZnO, $Al_2O_3$, $BaTiO_3$, a metal-organic framework (MOF), or a combination thereof. The silsesquioxane may have a cage structure.

For example, the cage-structured silsesquioxane may be a polyhedral oligomeric silsesquioxane (POSS). The number of silicon atoms in the POSS may be about 8 or less, for example, 6 or 8.

For example, the cage-structured silsesquioxane may be a compound represented by Formula 1.

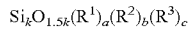  Formula 1

In Formula 1, $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group. In Formula 1, k=a+b+c, and 6≤k≤20.

For example, the cage-structured silsesquioxane may be a compound represented by Formula 2 or a compound represented by Formula 3.

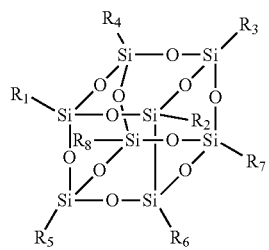

Formula 2

In Formula 2, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

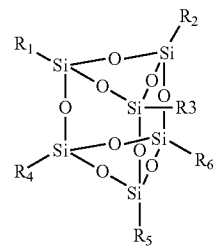

Formula 3

In Formula 3, $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, in the cage-structured silsesquioxane compound of Formula 2 or 3, $R_1$ to $R_8$ may be isobutyl groups. For example, the cage-structured silsesquioxane may be, for example, heptaisobutyl-t8-silsesquioxane.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

The amount of the inorganic particles may be in a range of about 1 part to about 40 parts by weight, and in some embodiments, about 5 parts to about 20 parts by weight, based on 100 parts by weight of the block copolymer including the structural domain and the rubbery domain. While not wishing to be bound by theory, it is understood that when the amount of the inorganic particles is within these ranges, an electrolyte with improved mechanical characteristics and improved ionic conductivity may be manufactured.

The metal-organic framework may be a porous crystalline compound in which a Group 12 to Group 15 metal ion or a Group 12 to Group 15 metal ionic cluster is chemically bonded with an organic ligand.

The organic ligand refers to an organic group that may form a bond such as coordinate bond, ionic bond, or covalent bond. For example, an organic group having at least two binding sites for such metal ions as described above may form a stable structure through binding with the metal ions.

The Group 2 to Group 5 metal ion may be cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), or bismuth (Bi). The organic ligand may be a group derived from an aromatic dicarboxylic acid, an aromatic tricarboxylic acid, an imidazole compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, compounds having an amino group, an imino group, an amide group, a methane dithio acid group (—CS$_2$H), a dithiocarboxylic acid group (—CS$_2$H), a dithiocarboxylic acid anion group (—CS$_2^-$), a pyridine group, a pyrazine group, or a combination thereof.

Non-limiting examples of the aromatic dicarboxylic acid and the aromatic tricarboxylic acid are benzene dicarboxylic acid, benzene tricarboxylic acid, biphenyl dicarboxylic acid, and triphenyl-dicarboxylic acid.

For example, the organic ligand may be a group originating from compounds represented by the following Formulae 4.

Formulae 4

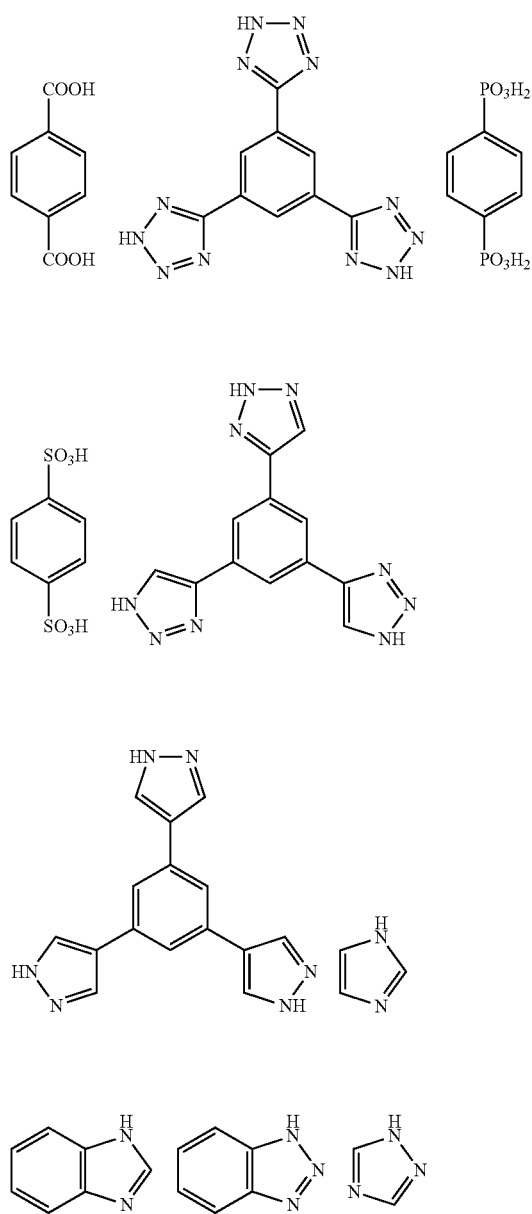

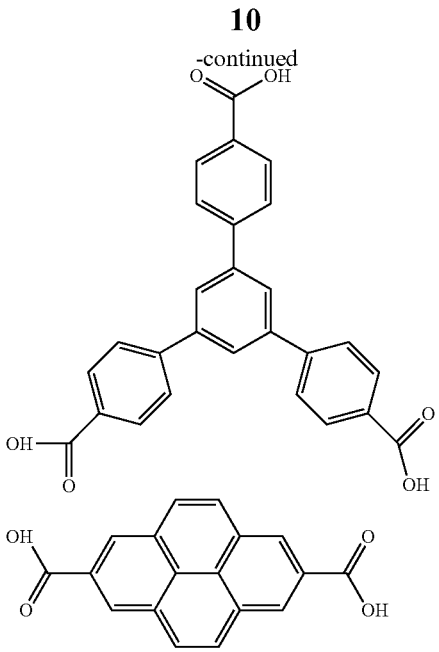

The metal-organic framework may be, for example, Ti$_8$O$_8$(OH)$_4$[O$_2$C—C$_6$H$_4$—CO$_2$]$_6$, Cu(bpy)(H$_2$O)$_2$(BF$_4$)$_2$(bpy) {bpy=4, 4'-bipyridine}, Zn$_4$O(O$_2$C—C$_6$H$_4$—CO$_2$)$_3$ (Zn-terephthalic acid-MOF, Zn-MOF), or Al(OH){O$_2$C—C$_6$H$_4$—CO$_2$}.

In some embodiments, the electrolyte may further include an ionic liquid.

An ionic liquid refers to a salt in a liquid state at room temperature or a fused salt at room temperature that includes only ions having a melting point below equal to or below room temperature. The ionic liquid of any of the composites according to the above-described embodiments may include:

i) a cation selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and a combination thereof, and ii) an anion selected from BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, (CF$_3$SO$_2$)$_2$N$^-$, (FSO$_2$)$_2$N$^-$, Cl$^-$, Br$^-$, I$^-$, SO$_4^-$, CF$_3$SO$_3^-$, (C$_2$F$_5$SO$_2$)$_2$N$^-$, (C$_2$F$_5$SO$_2$)(CF$_3$SO$_2$)N$^-$, and a combination thereof.

For example, the ionic liquid may be N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

For example, the amount of the ionic liquid may be in a range of about 5 parts to about 40 parts by weight, and in some embodiments, about 10 parts to about 20 parts by weight, based on 100 parts by weight of a total weight of the block copolymer including a structural domain and a rubbery domain. While not wishing to be bound by theory, it is understood that when the amount of the ionic liquid is within these ranges, the electrolyte may have improved ionic conductivity and improved mechanical characteristics.

In some embodiments, the electrolyte may further include an alkali metal salt, an alkali earth metal salt, or a combination thereof to have further improved ionic conductivity.

The amount of the alkali metal salt, the alkali earth metal salt, or a combination thereof may be in a range of about 10 parts to about 70 parts by weight, for example, about 20 parts to about 50 parts by weight, based on 100 parts by weight of a total weight of the block copolymer of the electrolyte.

While not wishing to be bound by theory, it is understood that when the amount of the alkali metal salt, the alkali earth metal salt, or a combination thereof is within these ranges, the electrolyte may have improved ionic conductivity. Non-limiting examples of the alkali metal salt or alkali earth metal salt are chlorides, hydrides, nitrides, phosphides, sulfonamides, triflates, thiocyanates, perchlorates, borates, or selenides, each including an alkali metal or an alkali earth metal. Non-limiting examples of the alkali metal or alkali earth metal are lithium, sodium, potassium, barium, and calcium.

For example, the alkali metal salt or the alkali earth metal salt may be LiSCN, LiN(CN)$_2$, LiClO$_4$, LiBF$_4$, LiAsF$_6$, LiPF$_6$, LiCF$_3$SO$_3$, LiN(SO$_2$F)$_2$, LiSbF$_6$, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiPF$_3$(C$_2$F$_5$)$_3$, LiPF$_3$(CF$_3$)$_3$, LiB(C$_2$O$_4$)$_2$, NaSCN, NaSO$_3$CF$_3$, KTFSI, NaTFSI, Ba(TFSI)$_2$, Pb(TFSI)$_2$, and Ca(TFSI)$_2$, or a combination thereof.

In some embodiments, the alkali metal salt or alkali earth metal salt may be LiCF$_3$SO$_3$, LiBF$_4$, LiN(CF$_3$SO$_2$)$_2$, LiN(SO$_2$F)$_2$, LiPF$_6$, LiAsF$_6$, LiSbF$_6$, LiPF$_3$(CF$_2$CF$_3$)$_3$, or a combination thereof.

When the electrolyte includes an ionic liquid and a lithium salt, a mole ratio (IL/Li) of the ionic liquid to lithium ions may be in a range of about 0.1 to about 2.0, in some embodiments, about 0.2 to about 1.8, and in some other embodiments, about 0.4 to about 1.5. While not wishing to be bound by theory, it is understood that when the electrolyte has a mole ratio of the ionic liquid to lithium ions within these ranges, the electrolyte may have high lithium ion mobility, high ionic conductivity, and improved mechanical properties to effectively suppress growth of lithium dendrite on an anode surface of a lithium secondary battery.

In some embodiments, the electrolyte may have an ionic conductivity of about 25° C. of about 1×10$^{-4}$ Siemens per centimeter (S/cm) or greater, in some embodiments, about 5×10$^{-4}$ S/cm or greater, and in some other embodiments, about 1×10$^{-3}$ S/cm or greater.

In some embodiments, the electrolyte may have a tensile modulus (Young's modulus) at about 25° C. of about 10 megaPascals (MPa) or greater, and in some embodiments, about 10 MPa to about 50 MPa. The electrolyte may have an elongation at about 25° C. of about 500% or greater, in some embodiments, about 600% or greater, and in some other embodiments, about 1,200% or greater or 1,300% or greater. For example, when including a polystyrene-polyisoprene-polystyrene block copolymer, the electrolyte may have an elongation of about 1,200% or greater or 1,300% or greater. For example, when a polystyrene-polybutadiene-polystyrene block copolymer is included, the electrolyte may have an elongation of about 600% or greater.

In some embodiments, the electrolyte may have improved mechanical characteristics, including tensile modulus and ductility characteristics, and improved ionic conductivity at about 25° C. that are both satisfactory for battery performance.

In some embodiments, the electrolyte may have a tensile strength of about 2.0 MPa or greater at about 25° C. In some embodiments, an interfacial resistance (R$_i$) at about 25° C. of the electrolyte, with respect to lithium metal and obtained from a Nyquist plot by impedance measurement, may be about 10% or less than a resistance of bare lithium metal. In this regard, when an electrolyte according to an embodiment is used as a lithium metal protection layer, the electrolyte may provide improved interfacial characteristics due to a reduced interfacial resistance with respect to lithium metal, compared to when only bare lithium metal is used.

In some embodiments, the electrolyte may have an oxidation current or reduction current of about 0.05 mA/cm$^2$ or less in a voltage range of about 0.0 V to about 6.0 V with respect to lithium metal.

In some embodiments, the electrolyte may be formed as a free-standing membrane.

The electrolyte may be used as a solid polymer electrolyte for a solid state battery, or as an electrolyte for lithium secondary batteries such as a lithium sulfur battery, a lithium air battery, a lithium ion battery, and a lithium polymer battery.

For example, the electrolyte may be a mixed electrolyte that further includes a liquid electrolyte, a solid electrolyte, a gel electrolyte, a polymer ionic liquid, an inorganic particle, a separator, or a combination thereof.

In some embodiments, the lithium secondary battery may further include a liquid electrolyte, a polymer ionic liquid, a solid electrolyte, a gel electrolyte, or a combination thereof, which may be disposed between the cathode and the electrolyte.

When a liquid electrolyte, a polymer ionic liquid, a solid electrolyte, a gel electrolyte, or a combination thereof is further included, the lithium secondary battery may have better ionic conductivity and mechanical properties.

In some embodiments, the electrolyte may further include a liquid electrolyte to allow the rubbery domain of the block copolymer to form an ion conduction pathway in the electrolyte.

The liquid electrolyte may further include an organic solvent, an ionic liquid, an alkali metal salt, an alkali earth metal salt, or a combination thereof. Non-limiting examples of the organic solvent are a carbonate solvent, a glyme solvent, and a dioxolane solvent.

Non-limiting examples of the carbonate solvent are ethylene carbonate, propylene carbonate, dimethyl carbonate, fluoroethylene carbonate, diethyl carbonate, or ethylmethyl carbonate. The glyme solvent may be, for example, poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), or poly(ethylene glycol) diacrylate (PEGDA). The dioxolane solvent may be, for example, 1,3-dioxolane, 4,5-diethyl-1,2-dioxolane, 4,5-dimethyl-1,3-dioxolane, 4-methyl-1,3-dioxolane, and 4-ethyl-1,3-dioxolane. For example, the organic solvent may be 2,2-dimethoxy-2-phenyl acetophenone, dimethyl ether (DME), dimethoxy ethane, diethoxy ethane, tetrahydrofuran, gamma-butyrolactone, or 1,1,2,2-tetrafluoroethyl 2,2,3,3-tetrafluoropropyl ether.

The polymer ionic liquid may be, for example, a polymerization product of ionic liquid monomers, or a polymeric compound. The polymer ionic liquid is highly soluble in an organic solvent, and thus may further improve the ionic conductivity of the electrolyte when further added.

In preparing a polymer ionic liquid by polymerization of ionic liquid monomers as described above, the resulting product from polymerization reaction may be washed and dried. It may subsequently undergo anionic substitution reaction to obtain appropriate anions that may improve solubility of the polymerization product in an organic solvent.

In some embodiments, the polymer ionic liquid may include a repeating unit that includes:

i) a cation derived from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof, and ii) an anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, and a combination thereof.

In some embodiments, the polymer ionic liquid may be prepared by polymerization of ionic liquid monomers. These ionic liquid monomers may have a polymerizable functional group. For example, the polymerizable functional group includes a vinyl group, an allyl group, an acrylate group, and a methacrylate group, and may include a cation derived from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof, or at least one of the above-listed anions.

Non-limiting examples of the ionic liquid monomers are 1-vinyl-3-ethylimidazolium bromide, a compound represented by Formula 5, or a compound represented by Formula 6.

Formula 5

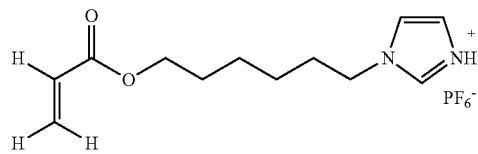

Formula 6

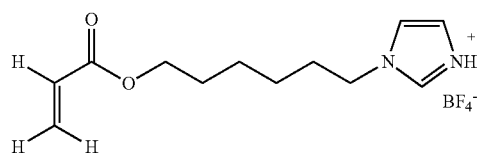

For example, the polymer ionic liquid may be a compound represented by Formula 7 or a compound represented by Formula 8.

Formula 7

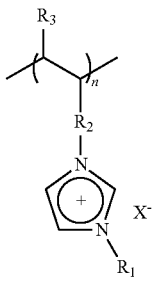

In Formula 7, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C1-C30 heteroalkyl group, a substituted or unsubstituted C6-C30 aryl group, a substituted or unsubstituted C2-C30 heteroaryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 carbocyclic group, or a substituted or unsubstituted C4-C30 carbocyclicoxy group;

$X^-$ indicates an anion of the ionic liquid; and n may be from 500 to about 2,800.

Formula 8

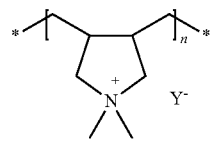

In Formula 8, $Y^-$, which indicates the same as $X^-$ in Formula 7, and n may be in a range of 500 to 2,800. For example, $Y^-$ in Formula 8 may be bis(trifluoromethanesulfonyl)imide (TFSI), bis(fluoromethanesulfonyl)imide, $BF_4^-$, or $CF_3SO_3^-$.

The polymer ionic liquid may include, for example, a cation selected from poly(1-vinyl-3-alkylimidazolium), poly(1-allyl-3-alkylimidazolium), poly(1-methacryloyloxy-3-alkylimidazolium), and a combination thereof, and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, $(CF_3SO_2)(CF_3CO)N^-$, and a combination thereof. For example, the compound of Formula 8 may be polydiallydimethyl ammonium bis(trifluoromethanesulfonyl)imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme). The low-molecular weight polymer may have a weight average molecular weight of about 75 to about 2,000, for example, a weight average molecular weight of about 250 to about 500.

The thermally stable ionic liquid may be the same as those listed above in conjunction with the above-described ionic liquid. The lithium salt may be any of the compounds described above as alkali metal salts as long as it includes lithium as an alkali metal.

In some embodiments, the electrolyte may further include a gel electrolyte. When the electrolyte further includes a gel electrolyte, the electrolyte may have better conductivity.

The gel electrolyte may be any electrolyte in gel form known in the art. For example, the gel electrolyte may include a polymer and a polymer ionic liquid. For example, the polymer may be a solid graft (block) copolymer electrolyte.

In some embodiments, the electrolyte may further include a solid electrolyte. For example, the solid electrolyte may be an organic solid electrolyte or an inorganic solid electrolyte.

Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 < x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$, (wherein $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), $Li_{7+x}A_xLa_{3-x}Zr_2O_{12}$ (wherein $0 < x < 3$, and A is Zn).

In some embodiments, the electrolyte may be in a solid or gel form. The electrolyte may be formed as a membrane, a film, or a sheet having a thickness of about 200 μm or less, and in some embodiments, about 0.1 μm to about 100 μm, and in some embodiments, about 1 μm to about 40 μm. A solid electrolyte in the form of a sheet, a film, or a membrane may be formed using a known technology, such as spin coating, roll coating, curtain coating, extruding, casting, screen printing, or inkjet printing.

In some embodiments, the electrolyte may have improved intensity and improved tensile modulus and ductility characteristics, improved ionic conductivity, improved lithium ion mobility, and improved stability against liquid electrolyte. Accordingly, the electrolyte may serve as a protective layer for lithium metal. Consequently, problems related to the lifetime and safety of the lithium secondary batteries, which are caused from the dendrite formation by highly reactive lithium, may be prevented with the present electrolyte. Therefore, a lithium secondary battery with improved capacity retention rate may be manufactured using an electrolyte according to any of the above-described embodiments.

In some embodiments, the electrolyte may be suitable for use in a high-voltage lithium secondary battery, for example, a lithium secondary battery having a charging voltage of about 4.0 V to about 5.5 V.

According to another aspect of the present disclosure, a method of manufacturing an electrolyte includes: obtaining an electrolyte composition that includes a block copolymer including a structural domain and a rubbery domain.

An organic solvent may be added to the electrolyte composition. The organic solvent may be any solvent available as an organic solvent in the art. Non-limiting examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof. The amount of the organic solvent may be from about 100 parts to about 3,000 parts by weight based on 100 parts by weight of the block copolymer.

In the obtaining of the electrolyte composition, an ionic liquid, a polymer ionic liquid, an alkali metal salt, and an alkali earth metal salt, or a combination thereof may be further added. An electrolyte in the form of a membrane may be formed using the electrolyte composition, for example, by coating the electrolyte composition on a base, drying the coated composition to form an electrolyte membrane, and separating the electrolyte membrane from the base.

The coating may be performed by any method available to form electrolytes in the art, for example, using spin coating, roll coating, curtain coating, extruding, casting, screen printing, inkjet printing, or by using a doctor blade.

In some embodiments, the electrolyte may have an oxidation current or reduction current of about 0.05 mA/cm² or less in a voltage range of about 0.0 V to about 6.0 V with respect to lithium metal.

The electrolyte may be electrochemically stable in a voltage range of about 0 V to about 6.0 V, in some embodiments, about 0 V to about 5.0 V, and in some other embodiments, about 0 V to about 4.0 V, with respect to lithium. An electrolyte according to any of the above-described embodiments may have an electrochemically stable wide voltage window, and thus may be applicable to an electrochemical device operating at high voltage.

In an electrolyte according to any of the above-described exemplary embodiments, a current density may result from side reactions, not from intercalation/deintercalation of lithium, at a voltage of about 0 V with respect to lithium may be about 0.05 mA/cm² or less, and in some embodiments, about 0.02 mA/cm² or less, and in some other embodiments, about 0.01 mA/cm² or less.

For example, a current density of the electrolyte resulting from oxidation reaction at a voltage of about 5.0 V with respect to lithium may be about 0.05 mA/cm² or less, in some embodiments, about 0.04 mA/cm² or less, and in some other embodiments, about 0.02 mA/cm².

According to another aspect of the present disclosure, a lithium secondary battery includes:
  a cathode,
  an anode, and
  an electrolyte disposed between the cathode and the anode, according to any of the above-described embodiments.

In some embodiments, the anode may be a lithium metal or lithium metal alloy electrode, and the lithium secondary battery may further include a liquid electrolyte, a gel electrolyte, a solid electrolyte, a polymer ionic liquid, a separator, or a combination thereof disposed between the cathode and the electrolyte according to any of the above-described embodiments.

In some embodiments, the anode may be a lithium metal or lithium metal alloy electrode, and the lithium secondary battery may further include a liquid electrolyte including an organic solvent, an ionic liquid, an alkali metal salt, an alkali earth metal salt, or a combination thereof disposed between the cathode and the electrolyte, according to any of the above-described embodiments.

Lithium secondary batteries have good voltage characteristics, high capacity, and high energy density. They are currently in wide use in mobile phones, laptop computers, storage batteries for power generating units using wind power or sunlight, electric vehicles, uninterruptible power supplies (UPS), household storage batteries, and the like.

FIGS. 2A to 2D are schematic views illustrating various structures of a lithium secondary battery including an electrolyte as described in one of the above exemplary embodiments according to exemplary embodiments.

Figure 2A:
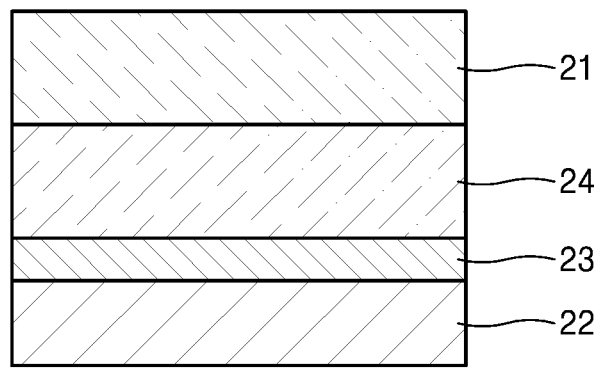
FIGS. 2A to 2D are schematic views illustrating various structures of a lithium secondary battery including an electrolyte according to an exemplary embodiment.

Referring to FIG. 2A, a lithium secondary battery according to an embodiment may have a structure including an electrolyte 23 according to the above-described embodiments disposed between a cathode 21 and an anode 22. The lithium secondary battery may further include an intermediate layer 24 disposed between the electrolyte 23 and the cathode 21. The intermediate layer 24 may include a liquid electrolyte, a polymer ionic liquid, a solid electrolyte, a gel electrolyte, or a combination thereof, each having a different composition from the electrolyte 23, and a separator.

Since the electrolyte 23 is disposed on at least part of a surface of the anode 22, the surface of the anode 22 may be mechanically and electrochemically stable. According, dendrite growth on the surface of the anode during charging and discharging of the lithium secondary battery may be suppressed, and interfacial stability between the anode 22 and the electrolyte 23 may be improved, thereby improving cycle characteristics of the lithium secondary battery.

The electrolyte 23 may serve as a protective layer for the surface of the anode 22 when it coats the surface of the anode 22. For example, the electrolyte 23 may prevent an electrolyte having high reactivity to the anode 22 from directly contacting the surface of the anode 22. Accordingly, the electrolyte 23 may protect the anode 22 to improve the stability of the anode 22.

Figure 2B:
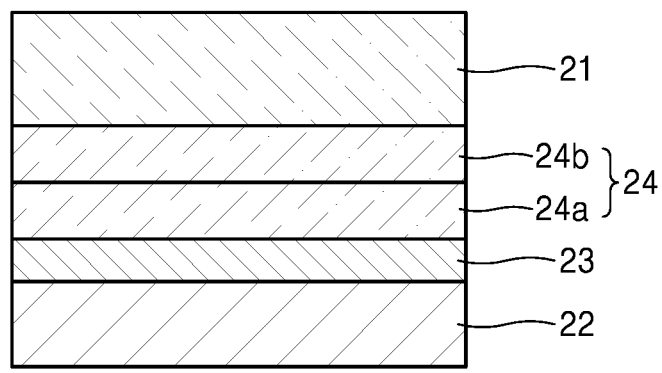

The intermediate layer 24 may have a 2-layer structure including a liquid electrolyte 24a and a solid electrolyte 24b that are sequentially disposed upon one another, as illustrated in FIG. 2B. The liquid electrolyte 24a may be disposed adjacent to the electrolyte 23. The lithium secondary battery may have a stack structure of anode/electrolyte/intermediate layer (liquid electrolyte/solid electrolyte)/cathode.

Figure 2C:
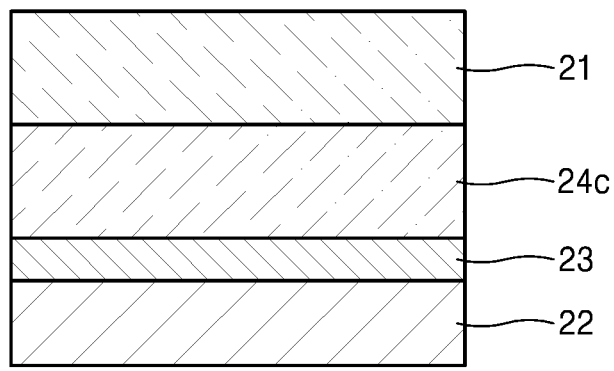

Referring to FIG. 2C, a lithium secondary battery according to another embodiment may include a c as an intermediate layer. The separator 24c may be a monolayer or a multilayer including at least two layers of polyethylene, polypropylene, polyvinylidene fluoride, or a combination thereof. For example, the separator 24c may be a mixed multilayer, such as a two-layer separator of polyethylene/polypropylene, a three-layer separator of polyethylene/polypropylene/polyethylene, or a three-layer separator of polypropylene/polyethylene/polypropylene. The separator 24c may include an electrolyte including a lithium salt and an organic solvent.

Figure 2D:
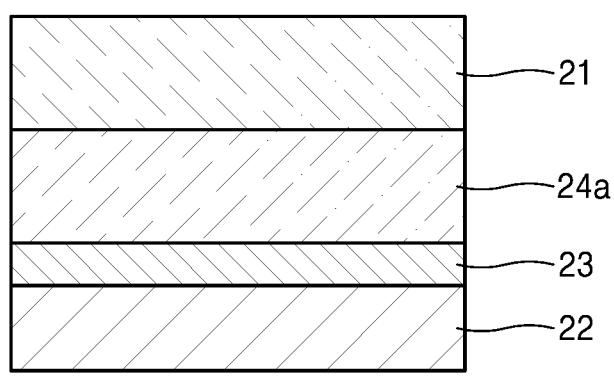

Referring to FIG. 2D, a lithium secondary battery according to another embodiment may include a liquid electrolyte 24a as an intermediate layer. The liquid electrolyte 24a may have a composition, which is the same as or different from the composition of a liquid electrolyte that the electrolyte 23 may include.

In FIGS. 2A to 2D, the cathode 21 may be a porous cathode. The porous cathode may be a cathode including pores, or any cathode that allows permeation of liquid electrolyte thereinto by capillary action.

For example, the porous cathode may be a cathode that may be obtained by coating a cathode active material composition including a cathode active material, a conducting agent, a binder, and a solvent and drying the resulting structure. The resulting cathode may include pores among particles of the cathode active material. The porous cathode may be impregnated with liquid electrolyte.

In some embodiments, the cathode 21 may include a liquid electrolyte, a gel electrolyte, a solid electrolyte, or the like. The liquid electrolyte, the gel electrolyte, and the solid electrolyte may be any electrolyte available for lithium secondary batteries in the art that does not react with the cathode active material, and thus prevent deterioration of the same during charging and discharging.

In FIGS. 2A to 2D, a lithium metal thin film may be used as the anode 22. The lithium metal thin film may have a thickness of less than about 100 μm. When the thickness of the lithium metal thin film is less than about 100 μm, the lithium secondary battery may have stable cycle characteristics. For example, the lithium metal thin film of the lithium secondary battery may have a thickness of about 80 μm or less, and in some embodiments, about 60 μm or less, and in some other embodiments, about 0.1 μm to about 60 μm. According to the prior art, when such a lithium metal thin film has a thickness of less than 100 μm, it is difficult to implement a lithium secondary battery with stable cycle characteristics since the thickness of the lithium metal thin film may be reduced due to a side reaction, dendrite formation, or the like. However, a lithium secondary battery with stable cycle characteristics may be manufactured using any of the electrolytes according to the above-described embodiments.

Figure 3:
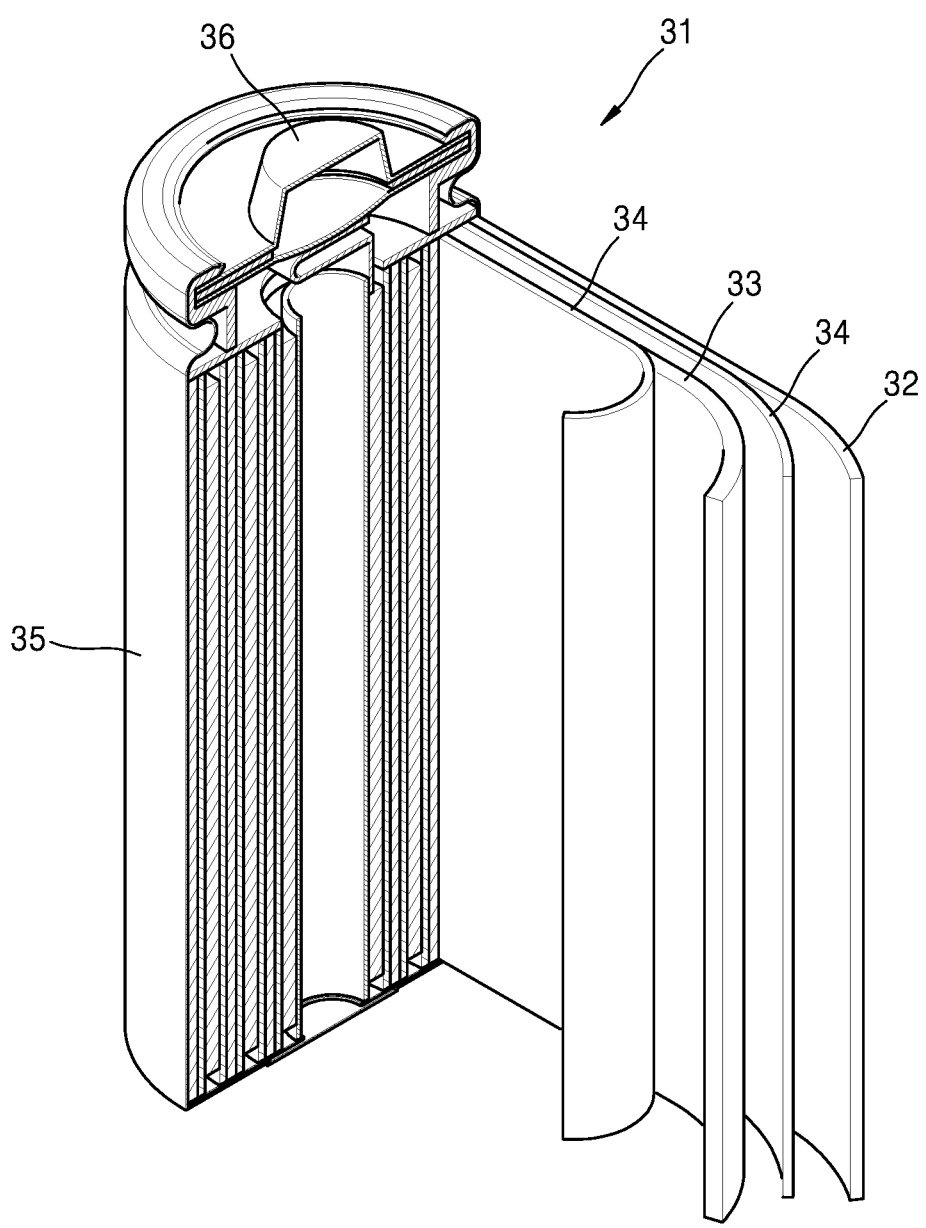
FIG. 3 is an exploded perspective view of a lithium secondary battery according to another embodiment.

FIG. 3 is an exploded perspective view illustrating a structure of a lithium secondary battery 31 according to another embodiment.

Referring to FIG. 3, the lithium secondary battery 31 may include a cathode 33, an anode 32, and an electrolyte 34 according to an embodiment. The cathode 33, the anode 32, and the electrolyte 34 may be rolled or folded, and may be accommodated in a battery case 35, followed by injecting an liquid electrolyte into the battery case 35 and sealing with a cap assembly 36, thereby completing manufacture of the lithium secondary battery 31. The battery case 35 may be a cylindrical, rectangular, or thin-film type. For example, the lithium secondary battery may be a large thin-film battery.

A separator (not shown) may be further disposed between the cathode 33 and anode 32 to form an electrode assembly. The electrode assembly may be staked on another electrode assembly to form a bicell structure, which may then be impregnated with liquid electrolyte. The resultant may be accommodated in a pouch and then sealed, thereby completing the manufacture of a lithium secondary battery.

In some embodiments, a plurality of electrode assemblies may be stacked upon one another to form a battery pack. The battery pack may be applicable in any device that requires a high capacity, for example, a laptop computer, a smart phone, an electric vehicle, or the like.

The lithium secondary battery may be, for example, a lithium air battery, a lithium sulfur battery, or the like.

According to another aspect of the present disclosure, a lithium secondary battery includes a cathode, an anode, and any of the electrolytes according to the above-described embodiments, wherein the anode is a lithium metal or lithium metal alloy electrode. For example, the lithium secondary battery may be a lithium metal battery.

The lithium secondary battery may further include a liquid electrolyte, a gel electrolyte, a polymer electrolyte, a polymer ionic liquid, a separator, or a combination thereof disposed between the electrolyte and the anode.

The electrolyte may serve as a protective layer for the lithium metal or lithium metal alloy electrode. The electrolyte may perform its own function with improved mechanical properties, without any organic solvent such as a carbonate solvent. When the electrolyte is disposed on a surface of the lithium anode, dendrite growth on the surface of the anode after charging and discharging, and a short circuit that may occur due to cracking of the electrolyte may both be effectively suppressed due to improved interfacial characteristics between the electrolyte and the lithium metal. The electrolyte may also be stable against a liquid electrolyte.

In some embodiments, the lithium secondary battery may have an operation voltage of about 4.0 V to about 5.0 V, for example, about 4.5 V to about 5.0 V.

In some embodiments, the lithium secondary battery may further include a liquid electrolyte, a polymer ionic liquid, a solid electrolyte, a gel electrolyte, or a combination thereof disposed between the cathode and the electrolyte.

Each of the components of the lithium secondary battery including any of the electrolytes according to the above-described embodiments, and a method of manufacturing a lithium secondary battery including such components will be described in greater detail.

A cathode active material for the cathode may include lithium cobalt oxide, lithium nickel cobalt manganese oxide, lithium nickel cobalt aluminum oxide, lithium iron phosphate, lithium manganese oxide, a combination thereof, but is not limited thereto. Any cathode active material available in the art may be used.

For example, the cathode active material may be a compound represented by one of the following formulae: $Li_aA_{1-b}B'_bD_2$ (wherein $0.90 \le a \le 1.8$ and $0 \le b \le 0.5$); $Li_aE_{1-b}B'_bO_{2-c}D'_c$ (wherein $0.90 \le a \le 1.8$, $0 \le b \le 0.5$, and $0 \le c \le 0.05$); $LiE_{2-b}B'_bO_{4-c}D'_c$ (wherein $0 \le b \le 0.5$ and $0 \le c \le 0.05$); $Li_aNi_{1-b-c}Co_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'_cD_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (wherein $0.90 \le a \le 1.8$, $0 \le b \le 0 \le c \le 0.05$, and $0 \le \alpha \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 \le \alpha \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 \le \alpha \le 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.5$, $0 \le d \le 0.5$, and $0.001 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the cathode active material may be a compound represented by Formula 9, a compound represented by Formula 10, or a compound represented by Formula 11.

$$Li_aNi_bCo_cMn_dO_2 \qquad \text{Formula 9}$$

In Formula 9, $0.90 \le a \le 1.8$, $0 \le b \le 0.9$, $0 \le c \le 0.5$, and $0 \le d \le 0.5$.

$$Li_2MnO_3 \qquad \text{Formula 10}$$

$$LiMO_2 \qquad \text{Formula 11}$$

In Formula 11, M may be Mn, Fe, Co, or Ni.

The cathode of the lithium secondary battery may be manufactured as follows. A cathode active material, a binder, and a solvent are mixed to prepare a cathode active material composition. A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The current collector may comprise a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

Examples of the conducting agent may include: carbon black; graphite particle; natural graphite; artificial graphite; acetylene black; Ketjen black; carbon fiber; carbon nanotube; metal powder, metal fiber or metal tube of copper, nickel, aluminum, silver, etc.; and conductive polymer such as polyphenylene derivative. However, the conducting agent is not limited to the examples, and the examples of the conducting agent may include all of the materials if materials may be used as the conducting agent in the art.

Examples of the binder may include vinylidene fluoride/hexafluoropropylene copolymers, polyvinylidene fluoride, polyimide, polyethylene, polyester, polyacrylonitrile, polymethyl methacrylate, polytetrafluoroethylene (PTFE), carboxymethyl cellulose/styrene-butadiene rubber (SMC/SBR) copolymers, styrene butadiene rubber-based polymers, and mixtures thereof. However, the binder is not limited to the examples, and the examples of the binder may include all of the materials if materials may be used as the binder in the art.

Examples of the solvent may include N-methylpyrrolidone (NMP), acetone, water, etc. However, the solvent is not limited to the examples, and the examples of the solvent may include all of the materials if materials may be used as the solvent in the art. If desired, a plasticizer may be further added into the cathode active material composition and/or the anode active material composition to form electrode plates including pores. The amounts of the cathode active material, the conducting agent, the binder, and the solvent may be the amounts that are generally used in lithium secondary batteries in the art. At least one of the conducting agent and the solvent may not be used depending on the use and the structure of the lithium secondary battery.

The anode of the lithium secondary battery may be manufactured in substantially the same manner as the cathode, except for using an anode active material instead of the cathode active material.

The anode active material may be a carbonaceous material, silicon, a silicon oxide, a silicon alloy, a silicon-carbonaceous material composite, tin, a tin alloy, a tin-carbon composite, a metal oxide, or a combination thereof. The carbonaceous material may be crystalline carbon, amorphous carbon, or a combination thereof. The crystalline carbon may be graphite, such as natural graphite or artificial graphite that are in non-shaped, plate, flake, spherical or fibrous form. The amorphous carbon may be soft carbon (carbon sintered at low temperatures), hard carbon, mesophase pitch carbonization products, sintered cokes, graphene, carbon black, fullerene soot, carbon nanotubes, and carbon fibers. Any appropriate material available in the art may be used.

The anode active material may be Si, $SiO_x$ (wherein $0<x<2$, for example, $0.5<x<1.5$), Sn, $SnO_2$, a silicon-containing metal alloy, and a combination thereof. A metal that is alloyable with silicon may be Al, Sn, Ag, Fe, Bi, Mg, Zn, In, Ge, Pb, Ti, or a combination thereof.

The anode active material may include a metal/metalloid alloyable with lithium, an alloy thereof, or an oxide thereof. Examples of the metal/metalloid alloyable with lithium are Si, Sn, Al, Ge, Pb, Bi, Sb, a Si—Y alloy (wherein Y is an alkali metal, an alkali earth metal, a Group 13 to 16 element, a transition metal, a rare earth element, or a combination thereof except for Si), a Sn—Y alloy (wherein Y is an alkali metal, an alkali earth metal, a Group 13 to 16 element, a transition metal, a rare earth element, or a combination thereof except for Sn), and $MnO_x$ (wherein $0<x\leq2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, a lithium vanadium oxide, $SnO_2$, and $SiO_x$ (wherein $0<x<2$).

For example, the anode may be a lithium anode thin film.

The conducting agent, binder, and solvent used in the anode active material composition may be the same as those used in the cathode active material composition described above.

The amounts of the anode active material, the conducting agent, the binder, and the solvent may be the amounts that are generally used in the manufacture of lithium secondary batteries in the art.

For example, the lithium secondary battery may further include a separator and/or a lithium salt-containing non-aqueous electrolyte that are in common use in lithium secondary batteries in the art, in addition to the electrolyte according to any of the above-described embodiments.

The separator may be an insulating thin film having high ion permeability and high mechanical strength. The separator may have a pore diameter of about 0.01 µm to about 10 µm, and a thickness of about 5 µm to about 20 µm. Examples of the separator are olefin polymers, such as polypropylene, and sheets or non-woven fabric made of glass fiber or polyethylene. When the electrolyte of the lithium battery is a solid polymer electrolyte, the solid polymer electrolyte may also serve as a separator.

The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene, and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be a carbonate solvent, such as propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, and chloroethylene carbonate, benzonitrile, acetonitrile, tetrahydrofuran, 2-methyltetrahydrofuran, y-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

To improve charge-discharge characteristics and resistance to flame, pyridine, triethylphosphate, triethanolamine, cyclic ether, ethylene diamine, n-glyme, hexamethyl phosphoramide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if desired.

In some embodiments, the lithium secondary battery may have improved capacity and improved lifetime characteristics, and thus may be used in a battery cell for use as a power source of a small device. The lithium secondary battery may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group. Non-limiting examples of the "alkyl" group are methyl, ethyl, n-propyl, iso-propyl, n-butyl, iso-butyl, sec-butyl, n-pentyl, iso-pentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

As used herein, the term "heteroalkyl" group indicates an alkyl group as defined above in which at least one carbon atom is replaced with a heteroatom selected from nitrogen (N), oxygen (O), phosphorus (P), or sulfur (S) and having carbon as remaining atoms. Non-limiting examples of the heteroalkyl are methylthio, dimethylamino, and the like. The $C_1$-$C_{20}$ heteroalkyl group does not include the $C_1$-$C_{20}$ alkoxy group.

The term "halogen atom" indicates fluorine, bromine, chloride, or iodine.

As used herein, the term "alkenyl" group indicates a branched or unbranched hydrocarbon group with at least one carbon-carbon double bond. Non-limiting examples of the alkenyl group are vinyl, allyl, butenyl, iso-propenyl, and iso-butenyl. At least one hydrogen atom in the alkenyl group may be substituted with any of the substituents for the alkyl group as described above.

As used herein, the term "alkynyl" indicates a branched or unbranched hydrocarbon group with at least one carbon-carbon triple bond. Non-limiting examples of the "alkynyl" group are ethynyl, butynyl, and propynyl. At least one hydrogen atom of the "alkynyl" group may be substituted with any of the substituents for the alkyl group as described above.

The term "aryl" is construed as including a group with an aromatic ring optionally fused to at least one carbocyclic group. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or bicyclic organic group including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyrid-2-yl, pyrid-3-yl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" indicates a heteroaromatic ring optionally fused to an aryl group, a cycloaliphatic group, or a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are norbornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon group is adamantyl.

As used herein, the term "heterocyclic" group indicates a C5-20 cyclic hydrocarbon group, for example, C5-C10 cyclic hydrocarbon group, including at least one hetero atom. For example, the hetero atom may be S, N, O, and B.

As used herein, the terms "alkoxy", "aryloxy", "carbocyclicoxy", and "heteroaryloxy" indicate alkyl, aryl, and heteroaryl, respectively, each bound to oxygen atom.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{30}$ alkyl" refers to a $C_1$-$C_{30}$ alkyl group substituted with $C_6$-$C_{30}$ aryl group, the total number of carbon atoms in the resulting aryl substituted alkyl group is $C_7$-$C_{60}$.

Hereinafter, one or more embodiments of the present disclosure will be described in detail with reference to the following examples. However, these examples are not intended to limit the scope of the one or more embodiments of the present disclosure.

EXAMPLES

Example 1

Preparation of Electrolyte

A polystyrene-b-polyisoprene-b-polystyrene block copolymer (available from Polymer Source) was added to anhydrous tetrahydrofuran (THF) to obtain a 5-wt % (percent by weight) block copolymer-including mixture. The block copolymer included a polystyrene block, a polyisoprene block, and a polystyrene block in a mixed ratio of about 11:78:11 by weight and had a weight average molecular weight (Mw) of about 100,000 Daltons.

Lithium bis(fluorosulfonyl) imide (LiFSI, $LiN(SO_2F)_2$) was added to the block copolymer-including mixture to obtain an electrolyte composition. The amount of LiFSI was about 30 parts by weight based on 100 parts by weight of the block copolymer.

After the electrolyte composition was cast on a substrate, THF in the resulting cast product was slowly evaporated at about 25° C. for about 24 hours in an argon glove box, and the cast product was further dried under vacuum at about 40° C. for about 24 hours, thereby preparing an electrolyte in membrane form. The electrolyte had a thickness of about 5 micrometers (μm).

Example 2

Preparation of Electrolyte

An electrolyte was prepared in the same manner as in Example 1, except that a polystyrene-b-polyisoprene-b-polystyrene block copolymer including a polystyrene block, a polyisoprene block, and a polystyrene block in a weight ratio of about 15:70:15 by weight was used.

Example 3

Preparation of Electrolyte

An electrolyte was prepared in the same manner as in Example 1, except that a polystyrene-b-polyisoprene-b-polystyrene block copolymer including a polystyrene block, a polyisoprene block, and a polystyrene block in a weight ratio of about 10:80:10 by weight was used.

Example 4

Preparation of Electrolyte

An electrolyte was prepared in the same manner as in Example 1, except that a polystyrene-b-polyisoprene-polystyrene block copolymer including a polystyrene block, a polyisoprene block, and a polystyrene block in a weight ratio of about 25:50:25 by weight was used.

Reference Example 1

Preparation of Electrolyte

A polystyrene-b-poly(ethylene oxide)-b-polystyrene(PS-b-PEO-b-PS) block copolymer (12-59-12 kilograms per mole (kg/mol), available from Polymer Source, number average molecular weight (Mn)=98,000 Daltons) was dissolved in a 5 wt %-anhydrous THF solution to obtain a first solution.

Lithium bistrifluoromethanesulfonimide (LiTFSI) powder was added to the first solution in a 20:1 mole ratio of ethylene oxide to lithium ions (EO/Li) and dissolved to obtain a second solution.

N-butyl-Nmethylpyrrolidinium bis(trifluoromethanesulfonyl)imide ($PYR_{14}TFSI$, ≥98%, HLPC grade, number average molecular weight (Mn)=422.41 Daltons, available from C-TRI), 10 wt % of poly(ethylene glycol) dimethyl ether (PEGDME, ≥99% HPLC grade, Mn=250 Daltons, available from Sigma Aldrich), and 5 wt % of Si having an average particle diameter of about 7 nanometers (nm) were added to the second solution to obtain a mixture. The mole ratio of the ionic liquid to lithium ions (IL/Li) was about 0.1.

The mixture was stirred at room temperature (25° C.) for about 24 hours, followed by sonication to uniformly disperse Si particles and obtain an electrolyte composition. After the electrolyte composition was cast on a Teflon dish, THF in the resulting cast product was slowly evaporated at about 25° C. for about 24 hours in an argon glove box, followed by drying under vacuum at about 60° C. for about 24 hours, thereby preparing an electrolyte in membrane form. The electrolyte had a thickness of about 40 μm.

Manufacturing Example 1

Manufacture of Lithium Secondary Battery

The electrolyte composition of Example 1 was coated on a lithium metal thin film (having a thickness of about 20 μm) by using a doctor blade to a thickness of about 5 μm, dried at about 25° C., and then thermally treated under vacuum at about 40° C. to manufacture a lithium metal anode with an electrolyte.

$LiCoO_2$, a conducting agent (Super-P, available from Timcal Ltd.), polyvinylidene fluoride (PVdF), and N-methylpyrrolidone were mixed together to obtain a cathode composition. A weight ratio of $LiCoO_2$, the conducting agent, and PVdF in the cathode composition was about 97:1.5:1.5.

The cathode composition was coated on an aluminum foil (having a thickness of about 15 μm), dried at about 25° C., and then further thermally treated under vacuum at about 110° C. to manufacture a cathode.

The cathode was assembled with the lithium metal anode (having a thickness of about 20 μm) having the electrolyte, such that the electrolyte was disposed between the cathode and the lithium metal anode, thereby manufacturing a lithium secondary battery (coin cell). After a polyethylene/polypropylene separator was disposed between the cathode and the electrolyte, a liquid electrolyte was added between the anode and the electrolyte. The liquid electrolyte was obtained by dissolving a 1.3 molar (M) $LiPF_6$ lithium salt in a mixed solvent of diethyl carbonate (DEC) and fluoroethylene carbonate (FEC) in a volume ratio of about 6:4.

Manufacturing Example 2

Manufacture of Lithium Secondary Battery

A lithium secondary battery was manufactured in the same manner as in Manufacturing Example 1, except that the electrolyte composition of Example 2, instead of the electrolyte composition of Example 1, was used.

Manufacturing Example 3

Manufacture of Lithium Secondary Battery

A lithium secondary battery as a full cell having a capacity of about 200 milliAmpere hours (mAh) was manufactured in the same manner as in Manufacturing Example 1, except that a liquid electrolyte obtained by dissolving 1 M LiFSI in a mixed solvent of dimethyl ether (DME) and 1,1,2,2-tetrafluoroethyl 2,2,3,3-tetrafluoropropyl ether (TTE) in a volume ratio of about 2:8.

Manufacturing Example 4

Manufacture of Lithium Secondary Battery

A lithium secondary battery was manufactured in the same manner as in Manufacturing Example 1, except that the electrolyte composition of Example 3, instead of the electrolyte composition of Example 1, was used.

Manufacturing Example 5

Manufacture of Lithium Secondary Battery

A lithium secondary battery was manufactured in the same manner as in Manufacturing Example 1, except that the electrolyte composition of Example 4, instead of the electrolyte composition of Example 1, was used.

Reference Manufacturing Example 1

Manufacture of Lithium Secondary Battery

A lithium secondary battery was manufactured in the same manner as in Manufacturing Example 1, except that the electrolyte composition of Reference Example 1, instead of the electrolyte composition of Example 1, was used.

Comparative Manufacturing Example 1

Manufacture of Lithium Secondary Battery $LiCoO_2$, a conducting agent (Super-P, available from Timcal Ltd.), polyvinylidene fluoride (PVdF), and N-methylpyrrolidone were mixed together to obtain a cathode composition. A weight ratio of $LiCoO_2$, the conducting agent, and PVdF in the cathode composition was about 97:1.5:1.5.

The cathode composition was coated on an aluminum foil (having a thickness of about 15 µm), dried at about 25° C., and then further thermally treated under vacuum at about 110° C. to manufacture a cathode.

A lithium secondary battery was manufactured using a polypropylene separator (Celgard 3510) and a liquid electrolyte between the cathode and the lithium metal anode (having a thickness of about 20 µm). The liquid electrolyte was obtained by dissolving 1.3 M $LiPF_6$ in a mixed solvent of diethyl carbonate (DEC) and fluoroethylene carbonate (FEC) in a volume ratio of about 6:4.

Comparative Manufacturing Example 2

Manufacture of Lithium Secondary Battery

A lithium secondary battery as a full cell having a capacity of about 200 mAh was manufactured in the same manner as in Comparative Manufacturing Example 1, except that a liquid electrolyte obtained by dissolving 1 M LiFSI in a mixed solvent of dimethyl ether (DME) and 1,1,2,2-tetrafluoroethyl 2,2,3,3-tetrafluoropropyl ether (TTE) in a volume ratio of about 2:8.

Evaluation Example 1

Impedance Measurement

Impedance measurements were performed on the lithium secondary batteries of Manufacturing Example 1 and Comparative Manufacturing Examples 1 and 3 by using a Solartron 1260A Impedance/Gain-Phase Analyzer) at an amplitude of about ±10 millivolts (mV) in a frequency range of about 0.1 Hertz (Hz) to about 1 megaHertz (MHz), according to a 2-probe method in which resistance was measured at about 25° C.

Figure 4:
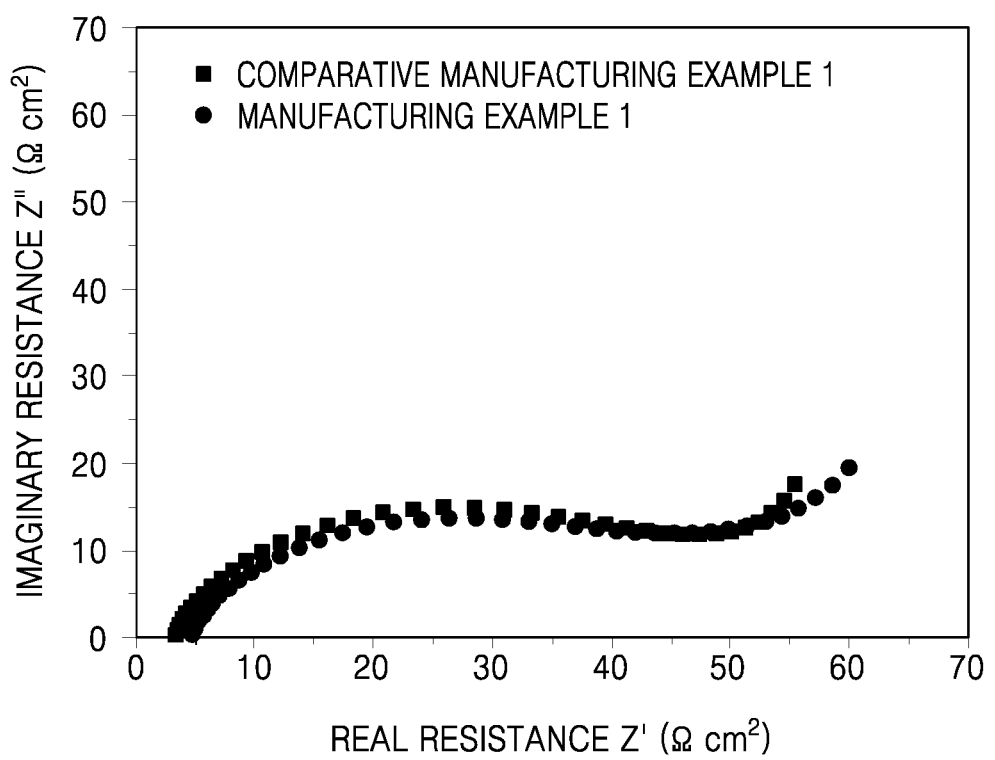
FIG. 4 is a graph of imaginary resistance (Z", Ohms-square centimeters, $\Omega cm^2$) versus real resistance (Z', Ohms-square centimeters, $\Omega cm^2$) and is a Nyquist plot illustrating the results of an impedance measurement on lithium secondary batteries of Manufacturing Example 1 and Comparative Manufacturing Example 1.

Nyquist plots obtained from the impedance measurements that were performed after 24 hours from the manufacture of the lithium secondary batteries of Manufacturing Example 1 and Comparative Manufacturing Example 1 are shown in FIG. 4. In FIG. 4, an interfacial resistance on the electrode is determined according to the positions and sizes of semicircles. A difference between the intercepts at the left X-axis axis and the right X-axis of a curve represents the interfacial resistance on the electrode.

Referring to FIG. 4, the lithium secondary battery of Manufacturing Example 1 was found to have a slightly reduced interfacial resistance compared to the lithium secondary battery of Comparative Manufacturing Example 1.

Evaluation Example 2

Charge-Discharge Characteristics (Discharge Capacity)

1) Manufacturing Examples 1, 2, 4, and 5 and Comparative Manufacturing Example 1

Each of the lithium secondary batteries of Manufacturing Examples 1, 2, 4, and 5 and Comparative Manufacturing Example 1 was charged at about 25° C. with a constant current of 0.1 C rate to a voltage of about 4.30 V (with respect to Li), and then with a constant voltage of 4.30 V until a cutoff current of a 0.05 C rate, and was then discharged with a constant current of a 0.1 C rate to a voltage of about 2.8 V (with respect to Li) (Formation process, $1^{st}$ cycle). This cycle of charge and discharge was performed 2 times more to complete the formation process.

Each of the lithium secondary batteries after the formation process was charged at room temperature (25° C.) with a constant current of 0.5 C to a voltage of about 4.4 V (with respect to lithium metal) and then discharged with a constant current of 0.2 C until a cutoff voltage of 3.0 V. The above cycle of charging and discharging was repeated 99 more times, i.e., the cycle of charging and discharging was performed 100 times altogether.

The capacity retention rate of each of the lithium secondary batteries was calculated using Equation 1.

$$\text{Capacity retention rate (\%)} = (100^{th} \text{ cycle discharge capacity} / 1^{st} \text{ cycle discharge capacity}) \times 100\% \quad \text{Equation 1}$$

Figure 5A:
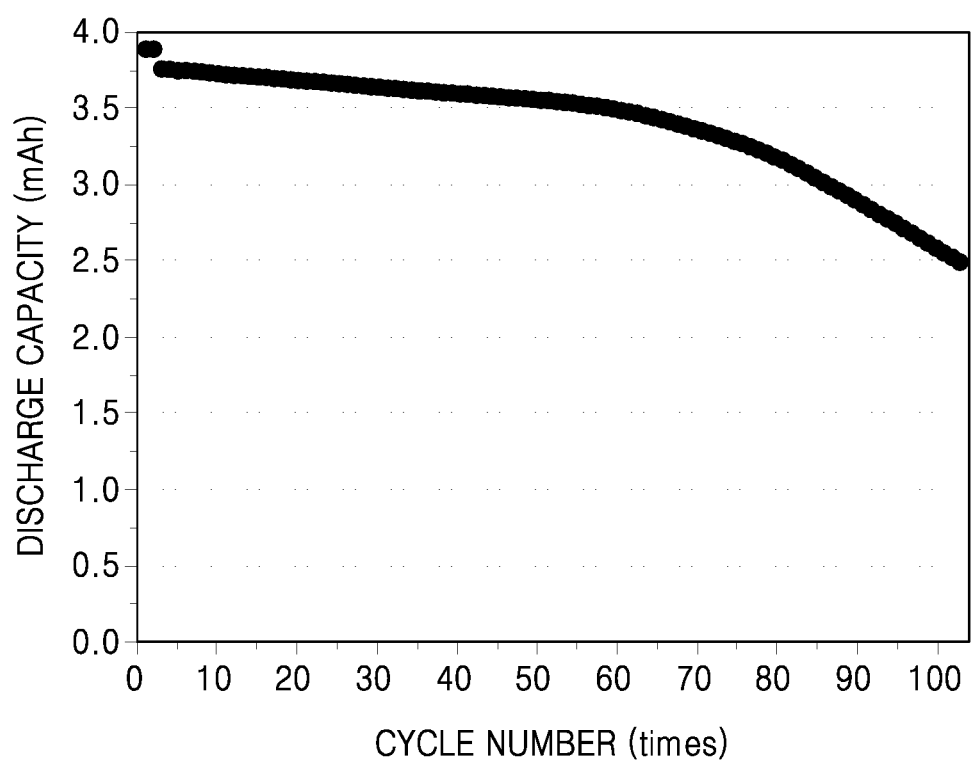
FIGS. 5A and 5B are graphs of discharge capacity (milliAmpere-hours, mAh) versus cycle number of the lithium secondary batteries of Manufacturing Example 1 and Comparative Manufacturing Example 1, respectively.
Figure 5B:
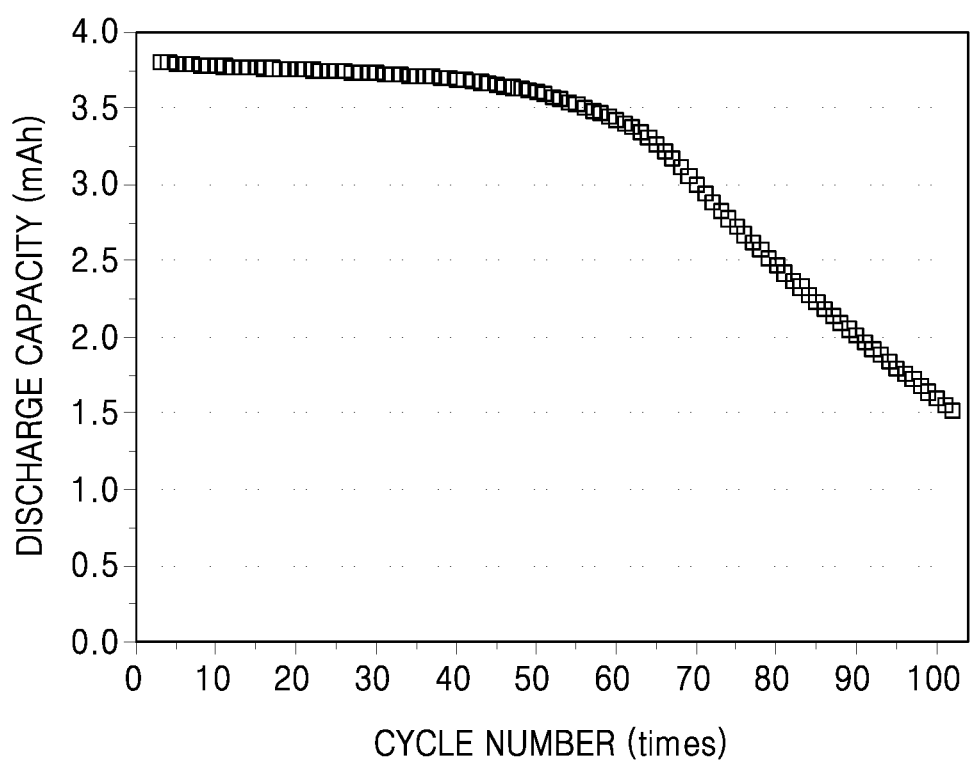

The results of evaluating charge-discharge characteristics of the lithium secondary batteries of Manufacturing Examples 1 and Comparative Manufacturing Example 1 are shown in FIGS. 5A and 5B, respectively. Changes in discharge capacity during 100 charge/discharge cycles are shown in FIGS. 5A and 5B, respectively, and the capacity retention rates thereof are shown in Table 1.

TABLE 1

| Example | $100^{th}$ cycle capacity retention rate (%) |
|---|---|
| Manufacturing Example 1 | 66.2 |
| Comparative Manufacturing Example 1 | 39.8 |

Referring to Table 1 and FIGS. 5A and 5B, the lithium secondary battery of Manufacturing Example 1 was found to have a remarkably improved capacity retention rate compared to the lithium secondary battery of Comparative Manufacturing Example 1. The lithium secondary batteries of Manufacturing Example 2, 4, and 5 also had nearly the same capacity retention rate characteristics as the lithium secondary battery of Manufacturing Example 1.

2) Manufacturing Example 3 and Comparative Manufacturing Example 2

Charge-discharge characteristics of the lithium secondary batteries of Manufacturing Example 3 and Comparative Manufacturing Example 2 were evaluated in the same manner as described above to evaluate those of the lithium secondary batteries of Manufacturing Example 1 and Comparative Manufacturing Example 1.

Figure 6A:
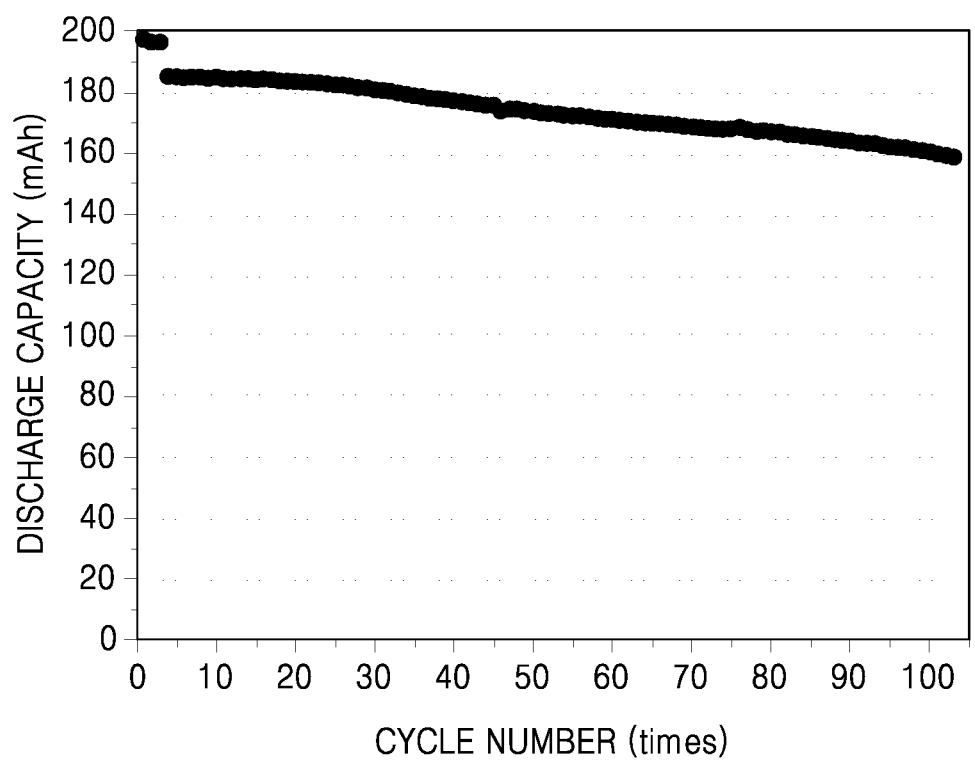
FIGS. 6A and 6B are graphs of discharge capacity (milliAmpere-hours, mAh) versus cycle number of the lithium secondary batteries of Manufacturing Example 3 and Comparative Manufacturing Example 2, respectively.
Figure 6B:
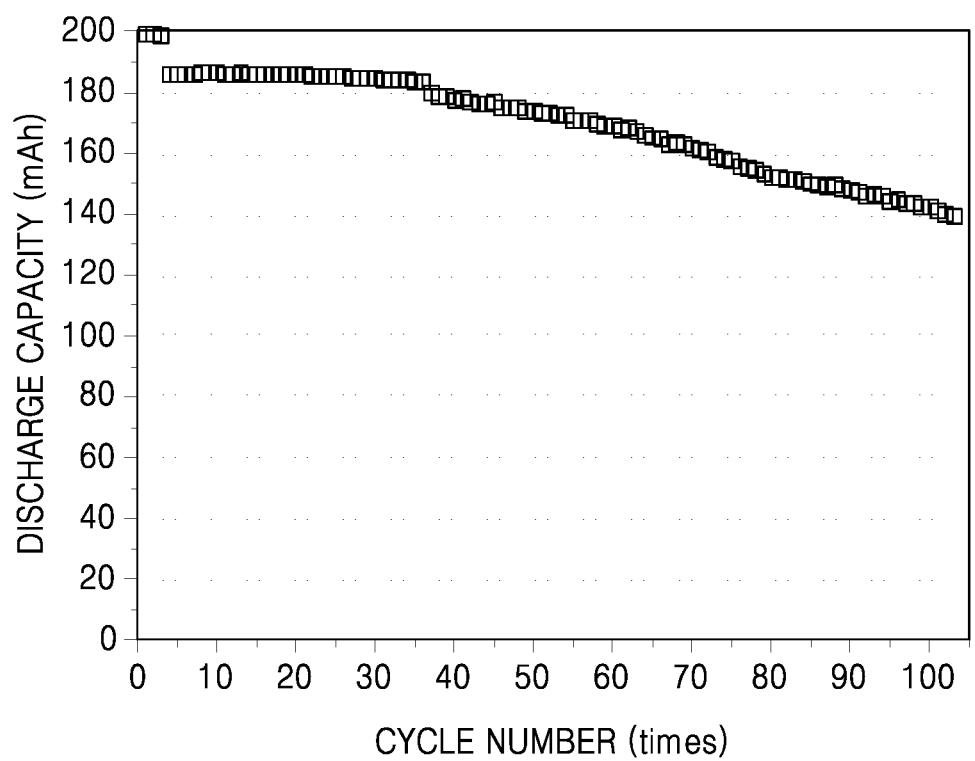

The results of evaluating the charge-discharge characteristics of the lithium secondary batteries of Manufacturing Example 3 and Comparative Manufacturing Example 2 are shown in FIGS. 6A and 6B, respectively. Changes in discharge capacity during 100 charge/discharge cycles in the lithium secondary batteries of Manufacturing Example 3 and Comparative Manufacturing Example 2 are shown in FIGS. 6A and 6B, respectively, and the capacity retention rates thereof are shown in Table 2.

TABLE 2

| Example | 100$^{th}$ cycle capacity retention rate (%) |
|---|---|
| Manufacturing Example 3 | 85.8 |
| Comparative Manufacturing Example 2 | 75.3 |

Referring to Table 2 and FIGS. 6A to 6B, the lithium secondary battery of Manufacturing Example 3 was found to have a remarkably improved capacity retention rate compared to the lithium secondary battery of Comparative Manufacturing Example 2.

Evaluation Example 3

Charge-Discharge Characteristics (Rate Capability)

Each of the lithium secondary batteries of Manufacturing Example 3 and Comparative Manufacturing Example 2 was charged at about 25° C. with a constant current of 0.1 C rate to a voltage of about 4.30 V (with respect to Li), and then with a constant voltage of 4.30 V until a cutoff current of a 0.05 C rate, and was then discharged with a constant current of a 0.1 C rate to a voltage of about 2.8 V (with respect to Li). This cycle of charge and discharge was performed 2 times more to complete the formation process.

Each of the lithium secondary batteries after the formation process was charged with a constant current of 0.1 C to a voltage of about 4.4 V and then discharged with a constant current of 0.1 C to a voltage of 2.5 V From the second cycle onwards, each of the lithium secondary batteries was charged with a constant current (CC) of 0.5 C to 4.4 V then with a constant voltage (CV) of 4.4 V until a current of 0.05 C, and was then discharged with a current of 0.1 C/0.2 C/1 C rate to 2.5 V. A cycle test was performed after charging with a CC of 1 C to 4.6 V and 50$^{th}$ discharging with 1.5 C to 2.5 V.

Figure 7:
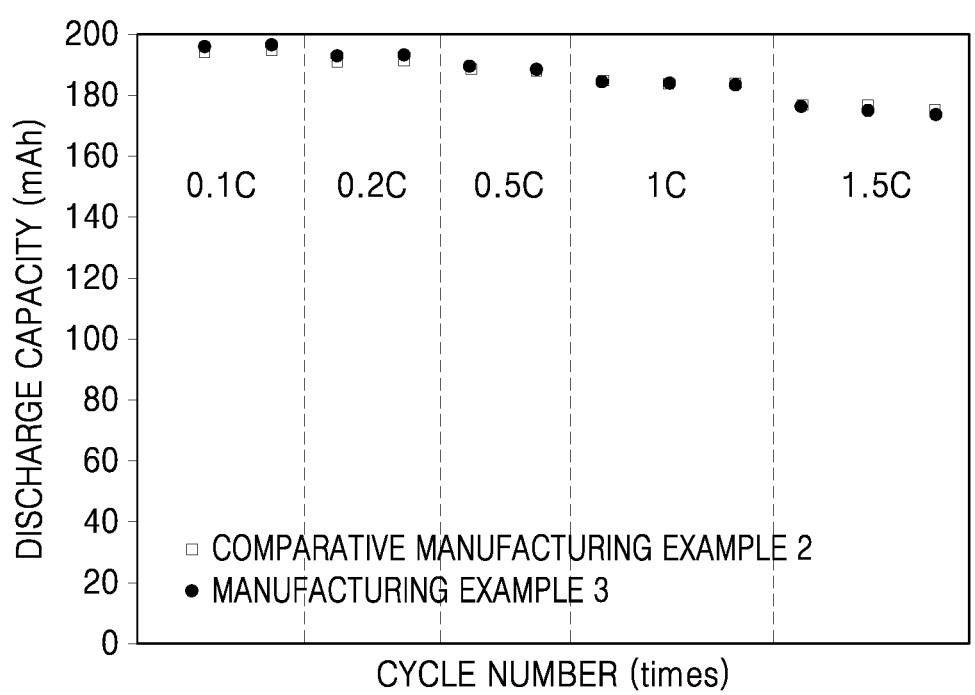
FIG. 7 is a graph of discharge capacity (milliAmpere-hours, mAh) versus cycle number, illustrating rate capability of the lithium secondary batteries of Manufacturing Example 3 and Comparative Manufacturing Example 2.

The rate capability of the lithium secondary batteries of Manufacturing Example 3 and Comparative Manufacturing Example 2 is shown in FIG. 7.

The rate capability of each of the lithium secondary batteries was calculated using Equation 2.

Rate capability={{Discharge capacity after cell discharging with 1.5 C)/(Discharge capacity after cell discharging with 0.2 C)}×100    Equation 2

As a result of evaluating the rate capabilities of the lithium secondary batteries, the discharge capacity at 1.5 C of the lithium secondary battery of Manufacturing Example 3 was found to be about 91% of the discharge capacity at 0.2 C. The lithium secondary battery of Manufacturing Example 3 was found to have nearly the same rate capability as the liquid secondary battery of Comparative Manufacturing Example 2.

Evaluation Example 4

Ionic Conductivity Measurement

Ionic conductivities of the electrolytes of Examples 1 and 2 and Reference Example 1 were measured as follows. The resistance of each of the electrolytes was measured while scanning the temperature thereof with a bias voltage of about 10 mV in a frequency range of about 1 Hz to 1 MHz to measure the ionic conductivity thereof.

As a result of the ionic conductivity measurement, the electrolyte of Example 1 was found to have nearly the same ionic conductivity as the electrolyte of Reference Example 1. The electrolyte of Example 2 also had nearly the same ionic conductivity as the electrolyte of Example 1.

Evaluation Example 5

Tensile Modulus and Elongation

Tensile moduli of the electrolytes of Example 1 and Reference Example 1, were measured using a DMA800 (available from TA Instruments). Electrolyte samples for the tensile modulus measurement were prepared according to the ASTM standard D412 (Type V specimens). The tensile modulus is also known as Young's modulus.

Figure 8:
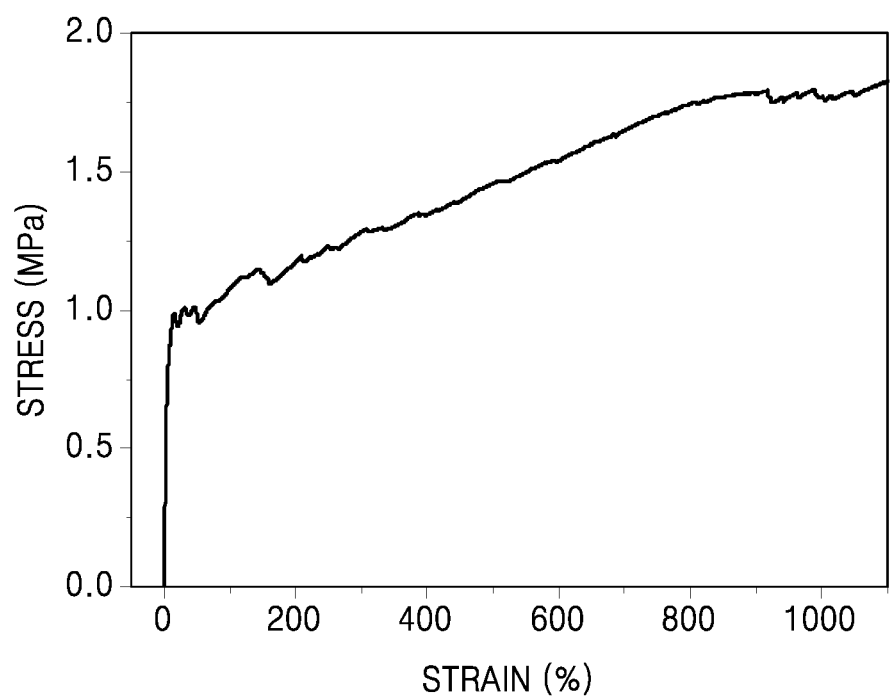
FIG. 8 is a graph of stress (megaPascals, MPa) versus strain (percent, %), and is a stress-strain curve of the electrolyte of Example 1.

Variations in strain with respect to stress in in the electrolyte of Example 1 were measured at about 25° C., a relative humidity of about 30%, and a rate of 5 millimeters per minute (mm/min). The results are shown in FIG. 8. The tensile modulus of the electrolyte of Example 1 was calculated from the slope of the stress-strain curve of FIG. 8, and the elongation thereof was obtained based on the strain values in FIG. 8.

As a result, the electrolyte of Example 1 was found to have a tensile modulus of about 25.7 megaPascals (MPa), which is as good as the electrolyte of Reference Example 1.

However, the electrolyte of Example 1 was found to have an elongation about 10 times greater than that of the electrolyte of Reference Example 1. These results indicate that the electrolyte of Example 1 had markedly improved ductility compared to the electrolyte of Reference Example 1.

Evaluation Example 6

Electrochemical Stability Evaluation

The lithium secondary batteries of Manufacturing Examples 1 and 2 and Comparative Manufacturing Example 1 were analyzed by cyclic voltammetry at a scan rate of about 1 milliVolts per second (mV/sec) in a voltage range of about 0 V to about 6 V (with respect to Li) to evaluate the electrochemical stability of the electrolyte coated on the lithium metal anode.

As a result of the electrochemical stability evaluation, the lithium secondary batteries of Manufacturing Examples 1 and 2 were found to cause neither decomposition nor any side reaction in the electrolyte thereof, except for intercalation and deintercalation of lithium at near 0 V, and to have a very low current density of about 0.02 mA/cm$^2$ caused by side reactions such as oxidation at a voltage of up to about 5.0 V, indicating that the electrolytes of the lithium secondary batteries of Manufacturing Examples 1 to 3 may be electrochemically stable in a voltage range of about 0 V to about 5 V.

As described above, according to the one or more of the above embodiments, an electrolyte for a lithium secondary battery may have improved tensile modulus and ductility characteristics, improved stability against liquid electrolyte, and improved ionic conductivity. A lithium secondary battery with improved capacity retention rate may be manufactured using the electrolyte.

It should be understood that the exemplary embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A lithium secondary battery, comprising:
    a cathode;
    a lithium thin film anode having a thickness of less than 100 micrometers; and
    a solid phase electrolyte for a lithium secondary battery, the solid phase electrolyte comprising
    a liquid electrolyte, and
    a triblock copolymer comprising a first structural block, a second structural block, and a rubbery block, wherein the rubbery block is between the first structural block and the second structural block,
    wherein the first structural block, the second structural block, or both the first structural block and the second structural block is polystyrene, hydrogenated polystyrene, poly(C1 to C8 alkyl)methacrylate, poly(methyl methacrylate), polyvinylpyridine, polyvinyl cyclohexane, polyimide, polyamide, polyethylene, polybutylene, polypropylene, poly(4-methylpentene-1), poly(butylene terephthalate), poly(isobutyl methacrylate), poly(ethylene terephthalate), polydimethylsiloxane, polyacrylonitrile, polymaleic acid, poly(maleic anhydride), poly(methacrylic acid), poly(tert-butyl vinyl ether), poly(cyclohexyl methacrylate), poly(cyclohexyl vinyl ether), polyvinylidenefluoride, polydivinylbenzene, a copolymer comprising at least two different structural units thereof, or a combination thereof,
    wherein the rubbery block is polyisoprene, polybutadiene, polychloroprene, polyisobutylene, or polyurethane, a copolymer comprising units thereof, or a combination thereof,
    wherein a weight ratio of the first and second structural blocks to the rubbery block is in a range of 1:1 to 1:4,
    wherein the triblock copolymer of the electrolyte does not comprise an alkylene oxide repeating unit, and
    wherein a total amount of the first structural block and the second structural block is 20 parts by weight to 35 parts by weight based on 100 parts by weight of a total weight of the block copolymer, and an amount of the rubbery block is 65 parts by weight to 80 parts by weight based on 100 parts by weight of the total weight of the block copolymer,
    wherein the liquid electrolyte is in the rubbery block of the solid phase electrolyte.

2. The lithium secondary battery of claim 1, wherein at least one of the first structure block and the second structural block of the triblock copolymer is in a form of a cylindrical phase.

3. The lithium secondary battery of claim 1, wherein the solid phase electrolyte further comprises a solid electrolyte, a polymer ionic liquid, a separator, or a combination thereof.

4. The lithium secondary battery of claim 1, wherein the solid phase liquid electrolyte comprises an ionic liquid, an organic solvent, an alkali metal salt, an alkaline earth metal salt, or a combination thereof.

5. The lithium secondary battery of claim 1, wherein the solid phase electrolyte has a tensile modulus of 10 megaPascals or greater at 25° C.

6. The lithium secondary battery of claim 1, wherein the solid phase electrolyte has an elongation of 500% or greater at 25° C.

7. The lithium secondary battery of claim 1, wherein the solid phase electrolyte has an ionic conductivity of $1\times10^{-4}$ Siemens per centimeter or greater at 25° C.

8. The lithium secondary battery of claim 1, wherein an interfacial resistance of the solid phase electrolyte with respect to lithium metal at 25° C. is at least 10% less than an interfacial resistance of bare lithium metal.

9. The lithium secondary battery of claim 1, wherein the solid phase electrolyte has an oxidation current or reduction current of about 0.05 milliAmperes per square centimeter or less in a voltage range of 0 Volts to 6 Volts with respect to lithium metal.

10. The lithium secondary battery of claim 1, wherein the solid phase electrolyte further comprises an ionic liquid comprising:
    i) a cation selected from an ammonium cation, a pyrrolidinium cation, a pyridinium cation, a pyridinium cation, an imidazolium cation, a piperidinium cation, a pyrazolium cation, an oxazolinium cation, a pyridazinium cation, a phosphonium cation, a sulfonium cation, a triazolium cation, or a combination thereof, and
    ii) an anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, and a combination thereof.

11. The lithium secondary battery of claim 1, wherein the solid phase electrolyte further comprises LiSCN, LiN(CN)$_2$, LiClO$_4$, LiBF$_4$, LiAsF$_6$, LiPF$_6$, LiCF$_3$SO$_3$, Li(CF$_3$SO$_2$)$_3$C, LiN(SO$_2$F)$_2$, LiN(SO$_2$C$_2$F$_5$)$_2$, LiN(SO$_2$CF$_3$)$_2$, LiSbF$_6$, LiPF$_3$(CF$_2$CF$_3$)$_3$, LiPF$_3$(CF$_3$)$_3$, LiB(C$_2$O$_4$)$_2$, NaSCN, NaSO$_3$CF$_3$, KTFSI, NaTFSI, Ba(TFSI)$_2$, Pb(TFSI)$_2$, Ca(TFSI)$_2$, or a combination thereof.

12. The lithium secondary battery of claim 1, wherein the triblock copolymer of the electrolyte is:
    a triblock copolymer comprising a polystyrene first block, a polyisoprene second block, and a polystyrene third block; or a triblock copolymer comprising a polystyrene first block, a polybutadiene second block, and a polystyrene third block.

13. The lithium secondary battery of claim 1, wherein the solid phase electrolyte is disposed between the cathode and the anode.

14. The lithium secondary battery of claim 1,
wherein the liquid electrolyte comprises an organic solvent, an ionic liquid, an alkali metal salt, an alkaline earth metal salt, or a combination thereof, and
wherein the liquid electrolyte is disposed between the electrolyte of claim 1 and the cathode.

15. The lithium secondary battery of claim 1,
wherein the anode is a lithium metal or a lithium metal alloy, and
wherein the lithium secondary battery further comprises, a solid electrolyte, a polymer ionic liquid, or a combination thereof, which is disposed between the electrolyte of claim 1 and the cathode.

16. The lithium secondary battery of claim 1, wherein the lithium secondary battery has a charging voltage of 4 Volts to 5.5 Volts.

17. The lithium secondary battery of claim 1, wherein the rubbery block is polybutadiene, polychloroprene, polyisobutylene, polyurethane, a copolymer comprising units thereof, or a combination thereof.

* * * * *